United States Patent
Shin et al.

(10) Patent No.: US 11,108,789 B2
(45) Date of Patent: Aug. 31, 2021

(54) IDENTIFYING COMPROMISED ELECTRONIC CONTROL UNITS VIA VOLTAGE FINGERPRINTING

(71) Applicant: THE REGENTS OF THE UNIVERSITY OF MICHIGAN, Ann Arbor, MI (US)

(72) Inventors: Kang G. Shin, Ann Arbor, MI (US); Kyong-Tak Cho, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 309 days.

(21) Appl. No.: 16/316,452

(22) PCT Filed: Jan. 13, 2017

(86) PCT No.: PCT/US2017/013508
§ 371 (c)(1),
(2) Date: Jan. 9, 2019

(87) PCT Pub. No.: WO2018/013171
PCT Pub. Date: Jan. 18, 2018

(65) Prior Publication Data
US 2019/0245872 A1    Aug. 8, 2019

Related U.S. Application Data

(60) Provisional application No. 62/362,627, filed on Jul. 15, 2016.

(51) Int. Cl.
*H04L 12/40* (2006.01)
*H04L 29/06* (2006.01)

(52) U.S. Cl.
CPC .......... *H04L 63/1416* (2013.01); *H04L 12/40* (2013.01); *H04L 12/40169* (2013.01);
(Continued)

(58) Field of Classification Search
CPC . H04L 63/1416; H04L 63/1425; H04L 12/40; H04L 2012/40215; H04L 2012/40273
See application file for complete search history.

(56) References Cited

U.S. PATENT DOCUMENTS 6,600,723 B1    7/2003   Reeb et al.
9,411,009 B1 *  8/2016   Aguayo Gonzalez .......................
                                              G06F 21/755
(Continued)

FOREIGN PATENT DOCUMENTS

EP    1858221 A1    11/2007

OTHER PUBLICATIONS

Wonsuk Choi, Hyo Jin Jo, Samuel Woo, Ji Young Chun, Jooyoung Park, and Dong Hoon Lee, Identifing ECUs Using Inimitable Characteristics of Signals in Controller Area Networks, Jul. 2, 2016, www.arxiv.org and https://dblp.org/rec/journals/corr/ChoiJWCPL16. html, pp. 1-12 (Year: 2016).*

(Continued)

*Primary Examiner* — Peter D Nolan
*Assistant Examiner* — Demetra R Smith-Stewart
(74) *Attorney, Agent, or Firm* — Harness, Dickey & Pierce, P.L.C.

(57) ABSTRACT

Research efforts to detect and prevent possible attacks on vehicles have led to various defense schemes that are capable of preventing attacks and/or determining the presence/absence of an attack on the in-vehicle network. However, these efforts still cannot identify which Electronic Control Unit (ECU) on the in-vehicle network actually mounted the attack. Moreover, they cannot detect attacks by an adversary that impersonates ECUs injecting in-vehicle messages aperiodically. Identifying the source of an attack is essential for efficient forensic, isolation, security patch, etc.

(Continued)

To fill these gaps, a method is presented for detecting and identifying compromised ECUs in a vehicle network.

18 Claims, 15 Drawing Sheets

(52) U.S. Cl.
CPC ............... *H04L 63/1425* (2013.01); *H04L 2012/40215* (2013.01); *H04L 2012/40273* (2013.01)

(56) References Cited

U.S. PATENT DOCUMENTS

| | | |
|---|---|---|
| 2009/0252045 A1 | 10/2009 | Noguchi |
| 2013/0081106 A1 | 3/2013 | Harata et al. |
| 2013/0159466 A1 | 6/2013 | Mao |
| 2013/0318607 A1 | 11/2013 | Reed et al. |
| 2015/0105973 A1 | 4/2015 | Cicala et al. |
| 2015/0349810 A1* | 12/2015 | Baxley ............... H04B 7/01 455/500 |
| 2015/0350902 A1* | 12/2015 | Baxley ............... H04W 12/122 726/7 |
| 2016/0173513 A1* | 6/2016 | Rohde ............... H04L 12/4625 726/23 |
| 2016/0352765 A1* | 12/2016 | Mermoud ........... H04L 63/1458 |

OTHER PUBLICATIONS

K. Cho, et al "Fingerprinting Electronic Control Units for Vehicle Intrusion Detection", 25th Usenix Security Symposium, www.usnix.org/sec16, (2016).

S. Woo et al "A Practical Wireless Attack on the Connected Car and Security Protocol for In-Vehicle Can", IEEE Transactions on Intelligent Transportation Systems 16.2 (2015).

W. Choi et al "Identifying ECUs Using Inimitable Characteristics of Signals in Controller Area Networks" arXiv preprint arXiv: 1607.00497 (2016).

P. Murvay et al "Source Identification Using Signal Characteristics in Controller Area Networks" IEEE Signal Processing Letters 21.4 (2014).

International Search Report and Written Opinion issued in PCT/US2017/013508, dated May 2, 2017; ISA/KR.

* cited by examiner

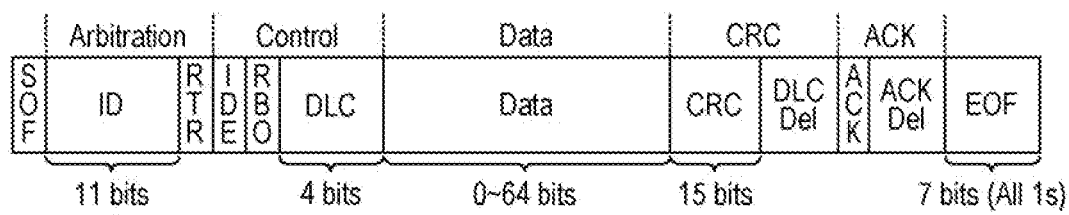
FIG. 1
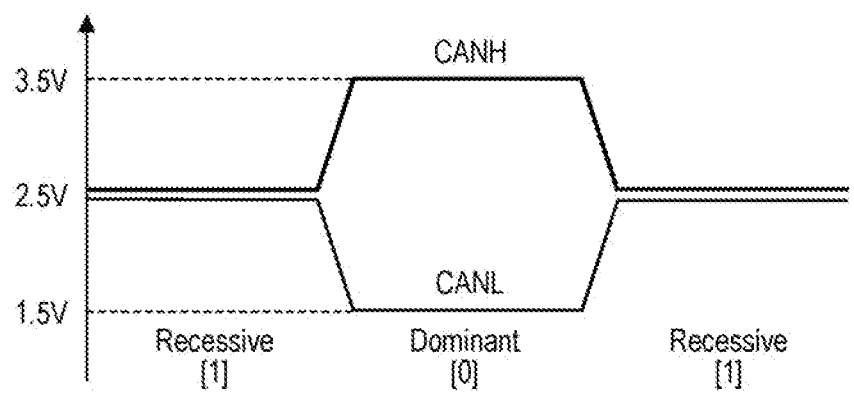
FIG. 2
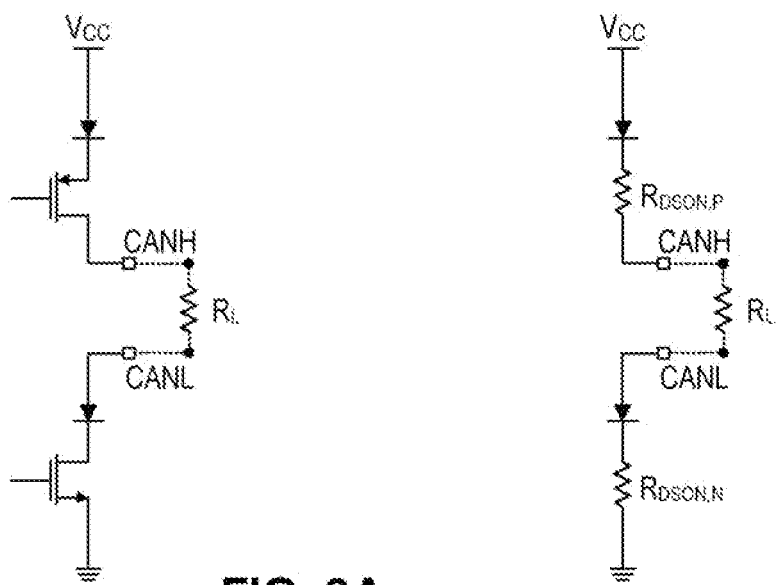
FIG. 3A          FIG. 3B

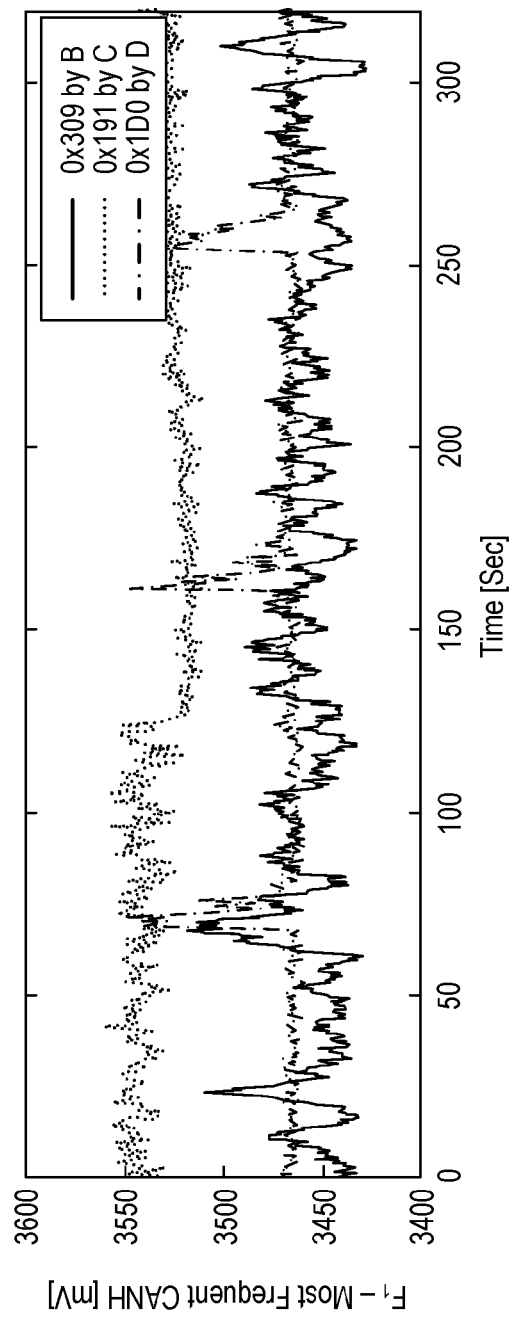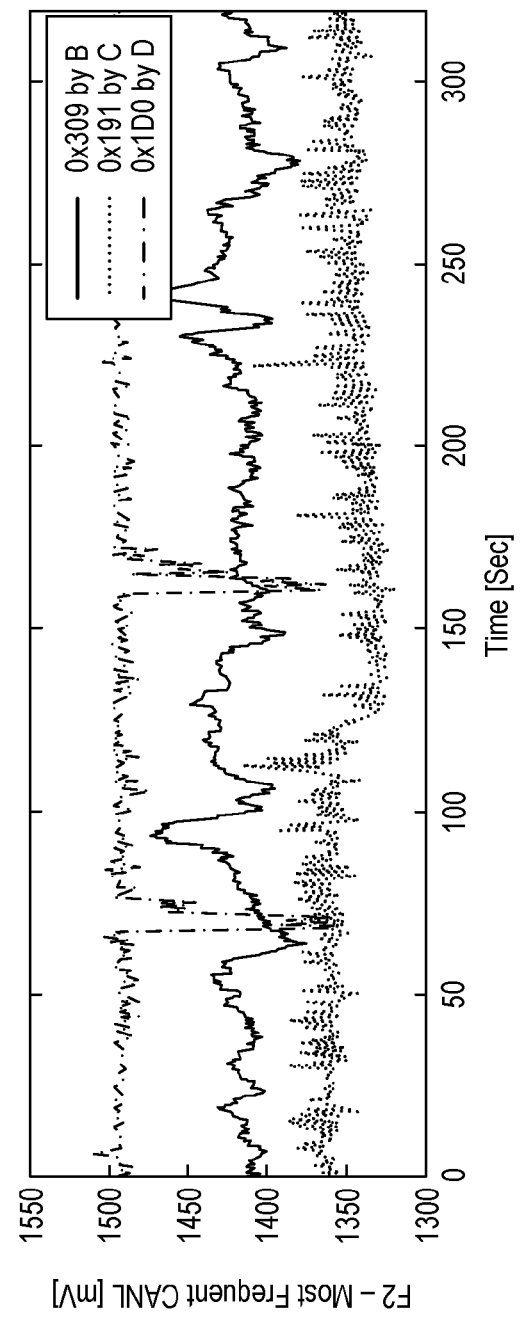
FIG. 13A

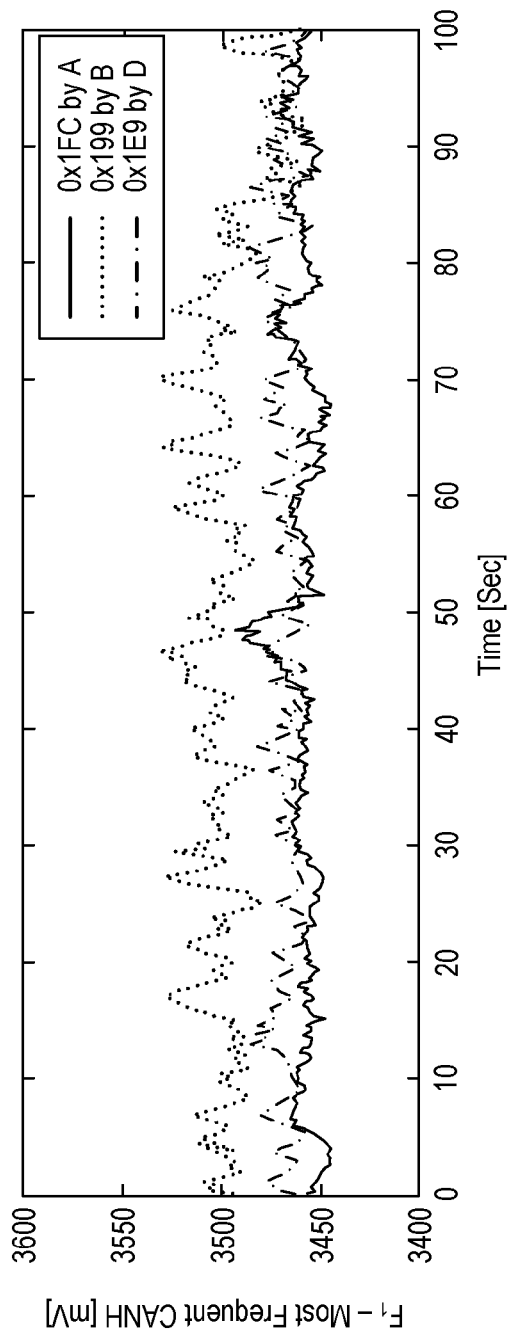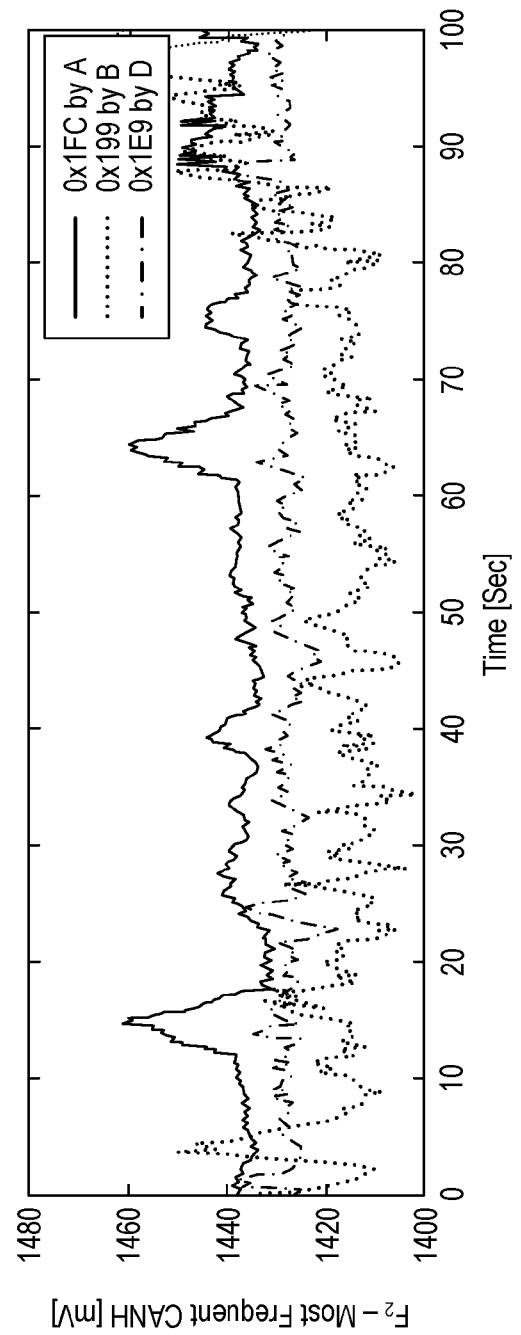
FIG. 13B

|   | A | B | C | D |
|---|---|---|---|---|
| A | 99.99 | 0 | 0.01 | 0 |
| B | 0.02 | 99.98 | 0 | 0 |
| C | 0 | 0 | 100 | 0 |
| D | 0 | 0 | 0 | 100 |

2013 Honda Accord

|   | A | B | C | D |
|---|---|---|---|---|
| A | 100 | 0 | 0 | 0 |
| B | 0 | 100 | 0 | 0 |
| C | 0 | 0 | 100 | 0 |
| D | 0 | 0 | 0 | 100 |

2015 Chevrolet Trax

FIG. 19

IDENTIFYING COMPROMISED ELECTRONIC CONTROL UNITS VIA VOLTAGE FINGERPRINTING

CROSS-REFERENCE TO RELATED APPLICATIONS

This application is the U.S. National Phase Application under 35 U.S.C. 371 of International Application No. PCT/US2017/013508, filed on Jan. 13, 2017, which claims the benefit of U.S. Provisional Application No. 62/362,627 filed on Jul. 15, 2016. The entire disclosures of the above applications are incorporated herein by reference.

FIELD

The present disclosure relates to identifying compromised electronic control units via voltage fingerprinting.

BACKGROUND

Remote and/or driverless control of a passenger car is no longer a science fiction. In fact, demonstration and deployment of such vehicle control has become prevalent and has been drawing significant R&D efforts and investments from industry, governments, and academia. Despite their numerous benefits, these disruptive technological developments have created serious safety/security concerns to drivers/passengers, car makers, and government regulatory agencies.

These concerns are genuine and real. For example, researchers have evaluated various remote access points (e.g., Bluetooth, Cellular) on vehicles and showed that an attacker can indeed exploit them to remotely compromise Electronic Control Units (ECUs) and thus control the vehicle. By exploiting the compromised ECUs, researchers have shown to be able to control vehicle maneuvers or shut down the in-vehicle network by injecting packets into the in-vehicle network. Recently, researchers were able to compromise and remotely control a Jeep Cherokee and a Tesla Model S.

To defend against these emerging vehicle cyber attacks, a number of schemes have been proposed to detect and/or prevent various vehicle cyber attacks. They solve/mitigate the vehicle cyber security problems, but all fail to meet the following important needs. First, although state-of-the-art defense schemes are capable of detecting whether there is an intrusion or not in the in-vehicle network, they cannot determine which ECU is actually mounting the attack. This is because in-vehicle networks—including the Controller Area Network (CAN) which is the de facto standard—are mostly configured as broadcast buses and their messages do not contain any information on their transmitters. An accurate root-cause analysis, however, is imperative as it provides a swift pathway for forensic, isolation, security patch, etc. Second, state-of-the-art Intrusion Detection Systems (IDSs) exploit the periodic nature of in-vehicle network messages. Since most of them are transmitted periodically, such an approach suffices in most cases, but they fail to detect intrusions mounted on aperiodic messages (e.g., impersonating an ECU which sends messages aperiodically).

No matter how well an IDS detects the intrusion on a vehicle, if one still does not know where the attack is coming from and which ECU to isolate/patch, the vehicle will remain insecure and unsafe. It would be much better and more economical to isolate or patch the ECU which is compromised and attacking the network, instead of blindly regarding all in-vehicle ECUs as controlled by the attacker.

This section provides background information related to the present disclosure which is not necessarily prior art.

SUMMARY

This section provides a general summary of the disclosure, and is not a comprehensive disclosure of its full scope or all of its features.

A method is presented for detecting a compromised electronic control unit (ECU) connected to a vehicle bus. A plurality of learned fingerprints are stored by a monitoring node in a data store accessible to the monitor node, where each fingerprint in the plurality of learned fingerprints is derived from voltage measurements made during transmission of a message on the vehicle bus and uniquely identifies one of the ECUs connected to the vehicle bus. During transmission of a message on the vehicle bus by an ECU, voltage on the vehicle bus is measured by the monitor node, voltage on the vehicle bus, where the voltage on the vehicle bus is measured at less than one million samples per second. From the plurality of voltage measurements made during the transmission of the message, an unknown fingerprint is constructed, where the unknown fingerprint is indicative of statistical dispersion of the voltage measurements; and then compared to the plurality of learned fingerprints, thereby detecting a comprised ECU.

Measuring voltage on the vehicle bus include voltage of dominant bits transmitted on the vehicle bus while discarding voltage measurements that correspond to an acknowledgement of the message.

To discard voltage measurements, a set of maximum values is extracted from voltage measurements made on the vehicle bus during a learning phase; a statistical distribution is determined for the set of maximum values; and a secondary peak in the statistical distribution of the maximum values is identified, where the secondary peak has a peak value less than peak value of a primary peak in the statistical distribution of the maximum values. The value of an ACK threshold is set as a function of the median or mean of values associated with the secondary peak, where the voltage measurements above the ACK threshold are discarded as correspond to an acknowledgement of the message.

In one embodiment, the value of the ACK threshold is set to the median of values associated with the secondary peak minus a multiple of median absolute deviation of the values associated with the secondary peak.

In another embodiment, the value of the ACK threshold is set to the mean of values associated with the secondary peak minus a multiple of median absolute deviation of the values associated with the secondary peak.

The secondary peak in the statistical distribution of the maximum values can be identified by extracting a set of most frequent values from voltage measurements made on the vehicle bus during a learning phase; determining a statistical distribution for the set of most frequent values; setting the value of a discard threshold in relation to the statistical distribution for the set of most frequency values; and discarding voltage measurements from the plurality of voltage measurements that are below the discard threshold.

Additionally, voltage measurements can be discarded by extracting a set of minimum values from voltage measurements made on the vehicle bus during a learning phase; determining a statistical distribution for the set of minimum values; identifying a secondary peak in the statistical distribution of the minimum values, where the secondary peak has a peak value less than peak value of a primary peak in the statistical distribution of the minimum values; and setting value of an ACK threshold as a function of the median or mean of values associated with the secondary peak, where the voltage measurements below the ACK threshold are discarded as correspond to an acknowledgement of the message.

In one embodiment, the unknown fingerprint is constructed by grouping the plurality of voltage measurements into groups of voltage measurements, where each group include two or more voltage measurements; for each group of voltage measurements, computing a median of the voltage measurements in the group of voltage measurements and computing one or more percentiles for the voltage measurements in the group of voltage measurements; for each group of voltage measurements, determining a cumulative deviation of the median of the voltage measurements in the group of voltage measurements from an expected mean value; for each group of voltage measurements, determining a cumulative deviation of the one or more percentiles of the voltage measurements in the group of voltage measurements from an expected percentile value; and for each group of voltage measurements, forming a voltage profile by summing the cumulative deviation of the median of the voltage measurements with the cumulative deviation of the one or more percentiles of the voltage measurements. Furthermore, the values of the voltage profile across groups of voltage measurements can be accumulated, such that the unknown fingerprint is defined as slope of the accumulated values.

In another embodiment, the unknown fingerprint is constructed by measuring voltage on a first wire of the two wires forming the vehicle bus; grouping the voltage measurements from the first wire into groups of first voltage measurements, where each group include two or more voltage measurements; for each group of first voltage measurements, computing a median of the voltage measurements in the group of voltage measurements and computing one or more percentiles for the voltage measurements in the group of voltage measurements; for each group of first voltage measurements, determining a cumulative deviation of the median of the voltage measurements in the group of voltage measurements from an expected median value; measuring voltage on a second wire of the two wires forming the vehicle bus; grouping the voltage measurements from the second wire into groups of second voltage measurements, where each group include two or more voltage measurements; for each group of second voltage measurements, computing a median of the voltage measurements in the group of voltage measurements and computing one or more percentiles for the voltage measurements in the group of voltage measurements; for each group of second voltage measurements, determining a cumulative deviation of the median of the voltage measurements in the group of second voltage measurements from an expected median value; for each group of second voltage measurements, determining a cumulative deviation of the one or more percentiles of the voltage measurements in the group of second voltage measurements from an expected percentile value; and forming a voltage profile by summing the cumulative deviation of the median of the voltage measurements in the group of first voltage measurements with the cumulative deviation of the median of the voltage measurements in the group of second voltage measurements and with the cumulative deviation of the one or more percentiles of the voltage measurements in the group of first voltage measurements and with the cumulative deviation of the one or more percentiles of the voltage measurements in the group of second voltage measurements.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a diagram showing the format of a CAN standard frame;

FIG. 2 is a diagram showing example CAN output voltages when sending a message;

FIG. 3A is an equivalent output schematic of a CAN transceiver;

FIG. 3B is an equivalent schematic when the transceiver is sending a 0-bit;

FIG. 13A are graphs showing features $F_1$ and $F_2$ outputted by a transmitter in the 2013 Honda Accord;

FIG. 13B are graphs showing features $F_1$ and $F_2$ outputted by a transmitter in the 2015 Chevrolet Trax;

FIG. 19 are confusion matrices for classification of ECU voltage instances for two different vehicles.

Corresponding reference numerals indicate corresponding parts throughout the several views of the drawings.

DETAILED DESCRIPTION

Figure 4:
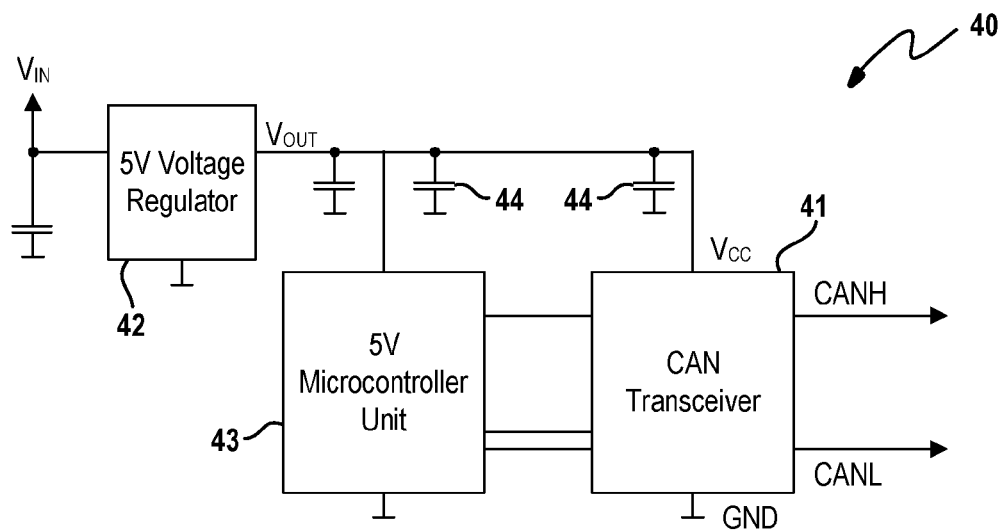
FIG. 4 is a schematic for a typical CAN application.

Example embodiments will now be described more fully with reference to the accompanying drawings.

In-vehicle ECUs periodically (and sometimes sporadically) broadcast their retrieved sensor (or computed) data so that other ECUs can utilize them for making control decisions.

FIG. 1 shows the standard format of a CAN data frame. Instead of containing information/address of the transmitter or receiver, a CAN frame contains a unique identifier (ID), which represents its priority and content (e.g., steering wheel angle, vehicle speed). The standard frame format has an 11-bit ID; whereas, an extended format has a 29-bit ID. Since the use of standard format is much more prevalent, this disclosure focuses on the standard format. Only one ECU is assigned to transmit a given ID at a time, and the ID values are defined to be distinct from each other by the manufacturer. Sensor data are packed into the frame's data field and are delivered in the form of a CAN frame/message, which basically is a sequence of dominant (logical 0) and recessive (logical 1) bits. ECUs other than the message transmitter acknowledge their message reception by sending a dominant (0) bit in the Acknowledgment (ACK) slot. Note that such an acknowledgment is made even before the transmitter finishes sending its message on the bus as seen in FIG. 1. This ACK is done by all ECUs on the bus that correctly receive the message, regardless of whether they are interested in its content or not. While reference is made to CAN throughout this application, it is readily understood that other types of communication protocols fall within the broader aspects of this disclosure.

Once the CAN bus is detected idle, a node with data to transmit, starts its frame transmission by sending a 0-bit in the Start-of-Frame (SOF) slot. It then enters a phase of arbitration in which bus access contention between ECUs is resolved. If the node wins the arbitration, it gains sole access of the bus and thus transmits the remaining fields as a stream of 0/1 bits.

To send either a dominant or a recessive bit, CAN transceivers (are agreed to) output certain voltage levels on the two dedicated CAN wires: CANH and CANL. As shown in FIG. 2, to issue a dominant bit on the CAN bus, CAN transceivers (are agreed to) output approximately 3.5V on the CANH line and 1.5V on the CANL line so that the differential voltage becomes approximately 2V. On the other hand, when sending a recessive bit, the transceivers output approximately 2.5V on both CANH and CANL, yielding approximately 0V of differential voltage. So, by measuring the differential voltage of CANH and CANL, receiver ECUs read the streams of 0 and 1 bits and thus receives the message on the bus. In this regard, CAN bus is considered as a differential bus.

CAN transceivers output the intended voltages by simultaneously switching on and off the transistors in the CAN transceivers. FIG. 3a shows an equivalent two-output schematic of a CAN transceiver connected to the bus. Note that multiple ECUs' CAN transceivers are connected to the CAN bus in parallel, thus sharing the same load resistance $R_L$, which is normally set to 60Ω. In one example, the high-side output circuit consists of a series diode and a P-channel transistor, while the low-side output circuit consists of a series diode and an N-channel transistor. The two series diodes block current from flowing in undesired directions.

For the transceiver to send a recessive (1) bit, both the high and low side transistors are switched off and are thus in a high impedance state. This results in negligible current flowing from $V_{CC}$ to ground, thus yielding negligible voltage across the load resistance ($R_L$) i.e., negligible differential voltage on CANH and CANL. On the other hand, when sending a dominant (0) bit, both transistors are turned on and are thus in a low impedance state. When the transistors are on, they can be equivalently described as resistors with drain-to-source on-state resistance ($R_{DSON}$) as shown in FIG. 3b, where current flows from $V_{CC}$ to ground through $R_L$ and thus creates a differential voltage of (approximately) 2V between CANH and CANL. This way of using the transistors as switches, the CAN transceivers are capable of outputting either 0 or 2V of differential voltage on the two CAN wires. How the transistors are turned on and off will be detailed below.

Adversaries can either physically or remotely compromise an in-vehicle ECU—connected to the in-vehicle CAN bus—through various attack surfaces and means. This disclosure does not consider an adversary who attaches a new device to the in-vehicle network (e.g., attaching a bogus ECU to the On-Board Diagnostic (OBD-II) system port). So, a compromised ECU would be one of those originally attached to the vehicle's CAN bus. The adversary's goal under consideration is to control the vehicle maneuver or disrupt the CAN bus through the compromised ECU(s). The adversary achieves this by injecting attack messages either in the form of fabrication, flood or masquerade attack.

Using a compromised ECU the adversary fabricates and injects attack messages with forged ID and data. In this attack, the attack message is forged to have ID=A which is the same as one sent by some other legitimate ECU. If the attack message is injected at a much higher frequency than legitimate ones, which can be referred to as a high-frequency fabrication attack, the adversary's attack messages will override the periodic messages sent by the legitimate (victim) ECU. This is because other receiver ECUs—which normally receive message ID=A for vehicle maneuver decisions (e.g., brake)—are forced to receive the attack messages much more often than the legitimate ones. If the attack message frequency is lower than or similar to the legitimate ones, which are called low-frequency fabrication attack, the adversary cannot override them since the legitimate ECU would still be periodically transmitting its messages. Thus, only through a high-frequency fabrication attack, the adversary can effectively control the vehicle maneuver.

The objective of a flood attack is to disrupt the in-vehicle network by flooding attack messages. It is similar to the high-frequency fabrication attack in the sense that the attack messages are injected at a very high frequency. However, the main difference is that the forged ID need not be the same as that some other ECU is already sending. In fact, since low ID values represent high priority in CAN, the ID value is forged to be a very low value (e.g., all 0s for the 11-bit ID field). This way, the adversary can prevent other ECUs from sending their messages—as they would always lose arbitration/contention to the adversary's attack messages—and thus mount a Denial-of-Service (DoS) attack.

Similarly to the fabrication attack, the objective of a masquerade attack is to control the vehicle maneuver. However, the adversary behaves a bit smarter to hide the fact that an attack is mounted. This is achieved by first shutting down the legitimate ECU that is sending ID=A and injecting attack messages with forged ID=A, instead, at its original frequency. As the legitimate ECU is not sending ID=A anymore, but the adversary is sending it instead, the CAN traffic is observed to be normal despite the change in message transmitter.

A significant amount of work has been done to prevent and detect the attacks mounted on the CAN bus, thus developing various solutions to determine whether or not an attack was mounted on CAN. However, they still cannot identify which ECU actually mounted the attack. Had the source of the attack been known or at least had the set of potential attackers been narrowed, one could expedite forensic, isolation, and security patches. Moreover, state-of-the-art approaches are unable to detect intrusions on aperiodic messages. These are difficult problems, though, because CAN messages are broadcast and do not carry any information on their senders.

To overcome these difficulties, a method is presented for detecting a compromised ECU. The method is a fingerprinting scheme that exploits small discrepancies in different ECUs' CANH and CANL voltages when they are sending dominant bits. Some useful characteristics related to the cause of these discrepancies were uncovered and then used to fingerprint the message transmitters for root-cause analysis and intrusion detection.

FIG. 4 shows a typical schematic of a CAN ECU 40. In order to output the desired voltage levels on CANH and CANL, a CAN transceiver 41 is powered at 5V, i.e., $V_{CC}=5V$. The input voltage ($V_{IN}$) from a power supply goes through a voltage regulator 42, which provides and maintains 5V for the CAN transceiver 41. The CAN transceiver 41 is also connected to the microcontroller unit (MCU) 43 so as to exchange information for sending and receiving messages.

CAN transceivers are powered with a nominal supply voltage of 5V which is maintained by a voltage regulator. As the load and the input voltage vary over time and affect the voltage regulator's output, it continuously compensates for the output to maintain the desired nominal voltage. Moreover, as shown in FIG. 4, the connected bypass capacitors 44 help stabilize the output voltage further. However, such an output voltage of an ECU varies independently and differently from other ECUs, since their loads and supply characteristics are different. For example, voltage regulators, which have poor common-mode rejection ratio (CMRR), would have more difficulties in maintaining their desired voltage levels than those with good CMRR, since their output voltages ($V_{OUT}$) would be affected much more by input voltage ($V_{IN}$) deviations. Thus, differences in the voltage supply characteristics make CAN nodes have small but non-negligible differences in their $V_{CC}$.

There exist variations in not only $V_{CC}$ but also in the ground voltage. Communication problems may occur in CAN if the transceiver ground quality is poor or ground is missing. A single common ground would be ideal for CAN, but a perfect ground does not exist. So, CAN transceivers function with ground differences or shifts up to a few volts, i.e., ground differs for different ECUs.

For these reasons, CAN transceivers are built to operate over a range of voltages. For example, TI SN65HVD1040-01 devices are designed to handle 5% supply variations (4.75V≤$V_{CC}$≤5.25V), and the new TI TCAN10xx family to handle 10% supply variations (4.5V≤$V_{CC}$≤5.5V). Therefore, even though different transceivers do not have exactly the same nominal $V_{CC}$ or ground, they are guaranteed to send and receive messages correctly. There exist variations in $V_{CC}$ and ground voltage among different ECUs.

When CAN transceivers send a dominant (0) bit, their two transistors are turned on so that current flows from $V_{CC}$ to ground in order to generate the required differential voltage on CANH and CANL. In such a case, transistors in the CAN transceivers are considered as resistors with resistance $R_{DSON,P/N}$ as shown in FIG. 3b. Although CAN transceivers are to have the same $R_{DSON,P/N}$ values so that they all output the same/agreed-on CANH and CANL output voltages, the process or manufacturing variations in their transistors, which naturally occur when integrated circuits are fabricated, cause them to be slightly different. In other words, even though the same type of transistors are used to design CAN transceivers, their actual $R_{DSON}$ values are slightly different from each other, even when they are driven with the same gate voltages.

Figure 5:
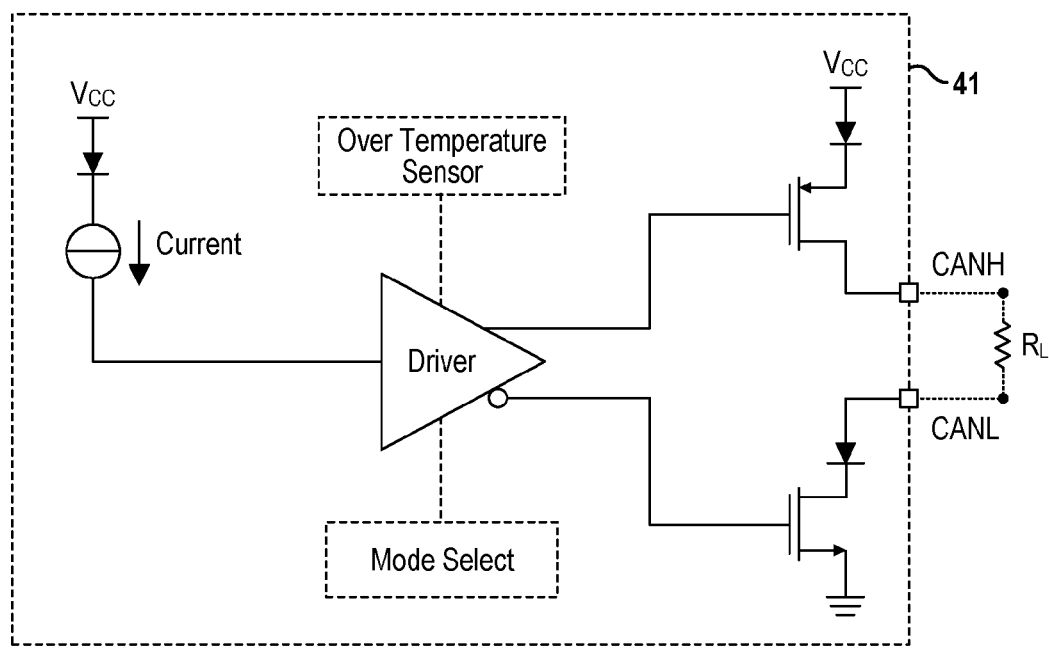
FIG. 5 is a diagram that showing how transistors' gate voltages are provided by a driver.

Differences in transistors' gate voltages (between ECUs) as well as process variations make their $R_{DSON}$ values different. FIG. 5 shows a typical block diagram of a CAN transceiver 41. Gate voltages for the high- and low-side transistors determine their on/off state and are provided by a driver, which operates as a fully differential amplifier. Moreover, the transistors' $R_{DSON}$ values are inversely related to their gate voltages, more precisely to the absolute differences between the gate and source voltages. The interesting fact is that as the input of the driver is affected by $V_{CC}$, which also varies with ECU (∀ 1), the output is also affected. Therefore, variations in $V_{CC}$ lead to variations in transistors' gate voltages and hence their actual $R_{DSON}$ values. Due to process variations and differences in the transistors' gate voltages, the P- and N-channel transistors in different CAN transceivers have different $R_{DSON,P}$ and $R_{DSON,N}$ values, when turned on during a dominant (0) bit transmission.

When transmitting a recessive (1) bit, the two transistors are simply turned off and put in a high impedance state. In such a case, since negligible current flows from $V_{CC}$ to ground, thus resembling the case of sending nothing or an idle bus, there isn't much variation between nodes. Thus, it is preferable not to consider any voltage measurements acquired when the transmitter was sending a recessive bit. Instead, only measurements when the transmitter was sending a dominant bit are considered, and refer to as dominant voltages.

Based on the schematic in FIG. 3b, when a CAN transceiver i is transmitting a dominant bit, the current, $I_{(i)}$ flowing from its $V_{CC(i)}$ to its ground can be derived as $$I_{(i)} = \frac{V_{CC(i)} - V_{G(i)} - 2V_D}{R_{DSON,P(i)} + R_{DSON,N(i)} + R_L},$$

where $V_{G(i)}$ denotes its ground voltage level, and $V_D$ the forward voltages of diodes (assuming they are equivalent). To simplify the analysis and calculation, other factors, such as leakage current or variations in diodes, are omitted. The CANH and CANL dominant voltages from transceiver i, i.e., $V_{CANH(i)}$ and $V_{CANL(i)}$ are derived as:

$$V_{CANH(i)} = V_{CC(i)} - V_D - I_{(i)}R_{DSON,P(i)} \qquad (1)$$
$$= V_{CC(i)} - V_D - \frac{(V_{CC(i)} - V_{G(i)} - 2V_D)R_{DSON,P(i)}}{R_{DSONP(i)} + R_{DSON,N(i)} + R_L},$$

$$V_{CANL(i)} = V_{G(i)} + V_D + I_{(i)}R_{DSON,N(i)}$$
$$= V_{G(i)} + V_D + \frac{(V_{CC(i)} - V_{G(i)} - 2V_D)R_{DSON,N(i)}}{R_{DSON,P(i)} + R_{DSON,N(i)} + R_L}$$

From (1), one can see that

∀ 3. Variations in ∀ 1), $V_{CC}$, ground and ∀ 2), $R_{DSON,P/N}$ result in different CAN ECUs/transceivers with different CANH and CANL dominant voltages (even though they are desired to have the same value).

The only factor different transceivers share is the load resistance, $R_L$. For these reasons, the ISO11898-2 specification requires that a compliant or compatible transceiver must accommodate dominant voltages of 2.75-4.5V for CANH and 0.5-2.25V for CANL. Hence, any values/measurements meeting this requirement are called dominant voltages.

As the two complementary outputs of the driver (shown in FIG. 5) act as the gate voltages of the P- and N-channel transistors, their transient changes increase/decrease $R_{DSON,P}$, and $R_{DSON,N}$ values in the same direction. For example, when $V_{OUT+}$ of the driver increases, $V_{OUT-}$ concurrently decreases as they are differential outputs. So, for both the P- and N-channel transistors, the absolute differences between their gate and source voltages, $|V_{GS}|$, simultaneously decrease. This results in both $R_{DSON,P}$, and $R_{DSON,N}$ to increase, i.e., change in the same direction. The transient changes can even be amplified if occurred at the input side of the driver. So, for a given $V_{CC}$ and ground voltage, the opposite signs of $I_1 R_{DSON,P(t)}$ in (1) indicate that ¶ 4. Transient changes in the driver's input and output affect the transistors' $R_{DSON,P/N}$ and thus make $V_{CANH}$ and $V_{CANL}$ temporarily deviate in the "opposite" direction; a property of CAN being a differential bus.

$V_{CC}$ is regulated and connected to bypass capacitors for stabilization. Similarly, ground voltages also remain constant. Moreover, since these two values are not affected by transient changes in on-state resistances, ¶ 5. Transient changes in $V_{CC}$ and ground are significantly smaller than the transient changes in $V_{CANH}$ and $V_{CANL}$, i.e., their values are rather constant.

Note, however, that from ¶ 1, values of $V_{CC}$ and ground are different for different ECUs. Experimental evaluations on a CAN prototype and on real vehicles that ¶ 1-¶ 5 hold in CAN, are shown and provide the distinctiveness of each ECU, and thus play a key role in the detection scheme.

Figure 6:
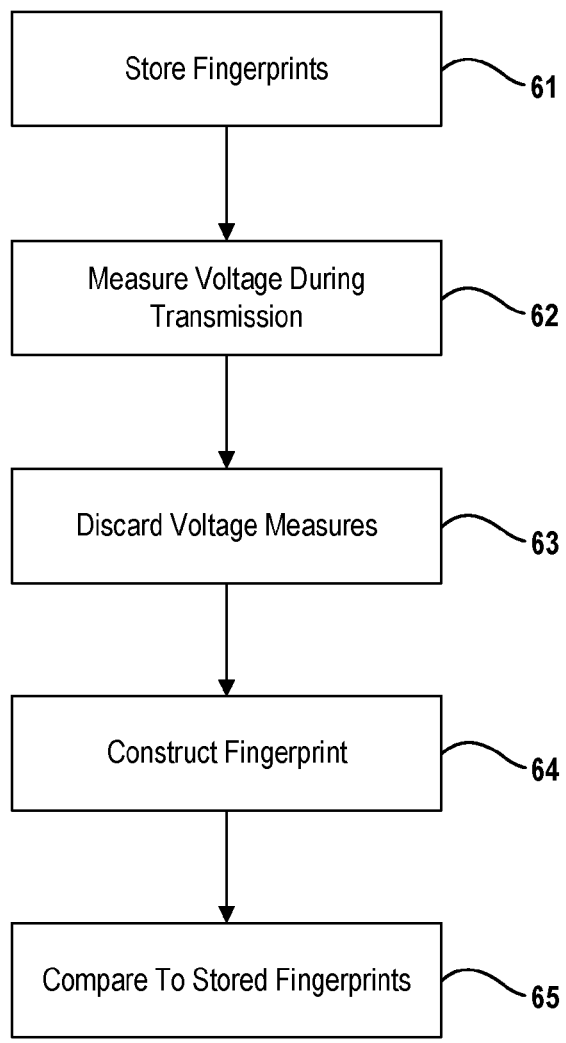
FIG. 6 is a flowchart providing an overview of the proposed detection scheme.

FIG. 6 provides an overview of the proposed scheme for detecting a compromised ECU. During a learning phase, a fingerprint is learned for each ECU connected to a vehicle bus. It is envisioned that the learning phase could occur during manufacturing of the vehicle and/or onsite at the manufacture's facility. As explained above, each fingerprint uniquely identifies one of the ECUs connected to the vehicle bus. Fingerprints are derived from voltage measurements made during transmission of a message on the vehicle bus as will be described in more detail below. As a result, a plurality of fingerprints are stored at 61 in a data store accessible to a monitor node residing in the vehicle.

To detect a compromised ECU, messages transmitted on the vehicle bus are monitored by the monitor node. Specifically, voltages are measured at 62 by the monitor node while messages are being transmitted on the vehicle bus. Voltages are preferably measured at a sampling rate less than one million samples per second. In some embodiments, a subset of the voltage measurements are discarded at 63, for example those measurements that correspond to an acknowledgement. From the remaining voltage measurements, a fingerprint is constructed at 64 for the unknown transmitter, where the unknown fingerprint is indicative of statistical dispersion of the voltage measurements. In a simple embodiment, the fingerprint is comprised of two or more metrics derived from the voltage measurements. For example, the fingerprint could be defined by a maximum voltage measure and its moving average as well as the most frequently measured voltage measure and its moving average. In a more robust embodiment, the fingerprint is comprised of metrics which are indicative of statistical dispersion of the voltage measurements, such as variance, standard deviation, interquartile values or ranges, etc. It is understood that such metrics can be combined together and/or with other metrics to form a fingerprint. These metrics are merely illustrative and other types of metrics can also be used to form a fingerprint.

By comparing the unknown fingerprint to the plurality of learned fingerprints, the identity of the unknown transmitting ECU can be determined at 65. In some embodiments, classification algorithms, including but not limited to k-nearest neighbor or support vector machine, may be used to compare the unknown fingerprint to the plurality of the learned fingerprints. Other comparison techniques are also envisioned by this disclosure. It is to be understood that only the relevant steps of the methodology are discussed in relation to FIG. 6, but that other software-implemented instructions may be needed to implement the detection scheme. Further details regarding how the detection scheme can be implemented are set forth below.

One aspect of the learning phase is to determine the ACK threshold. For a given message ID, the proposed detection scheme collects dominant voltages from the CAN bus and learns an ACK threshold. The learned threshold helps the proposed detection scheme determine whether or not the collected voltage originates from the actual message transmitter. Voltages having a magnitude above the ACK threshold may be discarded. An example embodiment for learning the ACK threshold is set forth below.

¶ 1-¶ 5 indicate that CANH and CANL outputs of each ECU/transceiver are slightly different from each other when they send dominant bits. The proposed detection scheme exploits this fact by collecting voltage measurements of dominant bits from both CANH and CANL, and using them in constructing different voltage profiles for different transmitters (i.e., fingerprinting).

In an example embodiment, the proposed detection scheme's measurement is triggered whenever a CANH voltage exceeding 2.75V is observed after a certain idle period. This is because the first measured voltage exceeding 2.75V represents the situation of some transmitter starting transmission in the SOF slot or sending a dominant bit on the bus. Note that as the proposed detection scheme requires no parsing and runs with low sampling rate (e.g., less than one million samples per second) for backward compatibility and easy deployment, it cannot determine from which slot the values were measured. All it knows is whether the measurement is a dominant or recessive voltage. Since the proposed detection scheme is only interested in measurements from the dominant bit, it discards any measurements that are lower than 2.75V on CANH and higher than 2.25V on CANL. The measurement continues until the entire message is accepted into a receive message buffer, i.e., an indication that the transmitter has finished sending that message. As a result, the proposed detection scheme acquires a set of dominant voltages for that message ID. The proposed detection scheme continuously collects more dominant voltages for that ID (whenever it sees the message again on the bus), and then derives its voltage profile as will be further described below.

When collecting and exploiting the voltage measurements, one needs to be cautious of the fact that during the ACK slot of a transmitted message, all other nodes (other than the transmitter) output a dominant bit on the CAN bus, if they have received the transmitted message. Thus, even though samples of at least a few dominant voltages are collected while receiving a certain message, not all of them represent the outputs from the actual message transmitter. The same applies when a voltage is collected while at least two nodes are contending in the arbitration phase. However, since the frequency of a contention is low, it does not affect much of the proposed detection scheme's performance and is not considered here.

Figure 7:
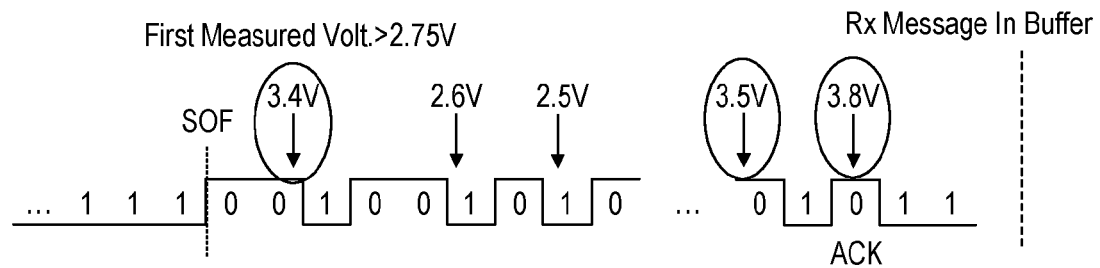
FIG. 7 is a diagram showing an example of how to measure CANH voltages.

FIG. 7 shows an example of the five voltage measurements of {3.4V, 2.6V, 2.5V, 3.5V, 3.8V} from the CANH line during the reception of a message, where 3.8V was measured during the ACK slot. Of them, the proposed detection scheme discards measurements {2.6V, 2.5V} since they do not meet the criteria of dominant voltages. If the proposed detection scheme had considered the remaining 3 measurements as if the voltage outputs were all from the message transmitter, it would have been incorrect since 3.8V was the resulting output from all ECUs except for the transmitter. Therefore, in order to fingerprint the transmitter correctly, the proposed detection scheme first distinguishes a non-ACK voltage measurement from an ACK voltage measurement. Non-ACK voltages are those that are dominant voltages measured from slots other than the ACK slot, and ACK voltages are those measured from the ACK slot. To achieve this, one can exploit the following facts K 1- K 2 of the ACK voltage measurements in CAN.

K 1. Probability of measurement: Consider a CAN message with 8 bytes of data. Then, among its 128 bits (the approximate length in total), only 1 bit is used for ACK. Accordingly, when measuring the dominant voltage during a message reception, most of them would be output from the transmitter rather than from others.

Figure 8:
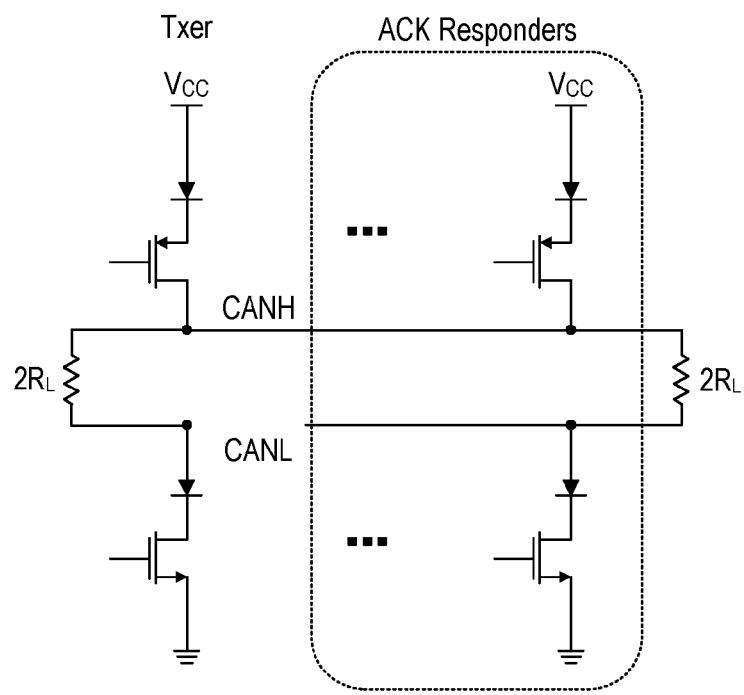
FIG. 8 is a diagram showing how multiple ECUs connected in parallel simultaneously acknowledge the message transmitted on the bus.

K 2. A different voltage level for the ACK: During the ACK slot, all ECUs other than the transmitter acknowledge their message reception. So, as shown in FIG. 8, multiple transmitters respond with a dominant bit in the ACK slot, and hence each of their transistors (in the CAN transceiver) are turned on concurrently in parallel. This makes the net resistances between $V_{CC}$-CANH and CANL-ground decrease, thus decreasing the voltage drops across them. As a result, when receiving the ACK bit, the measured voltages are much higher in CANH and much lower in CANL than when receiving non-ACK bits.

Exploiting these facts, the proposed detection scheme collects M dominant voltages from both CANH and CANL for N rounds for a given message ID. So, based on K 1, the most frequently measured voltage value (of the M values) would most likely represent only the non-ACK voltage. During the N rounds, the set of N most frequently measured values is referred to as the most frequent set, $S_{freq}$. On the other hand, if one determines the maximum and the minimum of the M values from CANH and CANL, respectively, then they would represent not only the non-ACK voltages but also the ACK voltages. This is because even a single dominant voltage value collected (unconsciously) from the ACK slot would become the maximum/minimum of the M values due to K 2. Here, the set of N maximum/minimum values measured from CANH/CANL is defined as the maximum/minimum set and is denoted as $S_{max/min}$. For each message ID, the proposed detection scheme exploits the most frequent and the maximum/minimum sets to derive the ACK threshold, i.e., the boundary between a non-ACK voltage and an ACK voltage.

Figure 9:
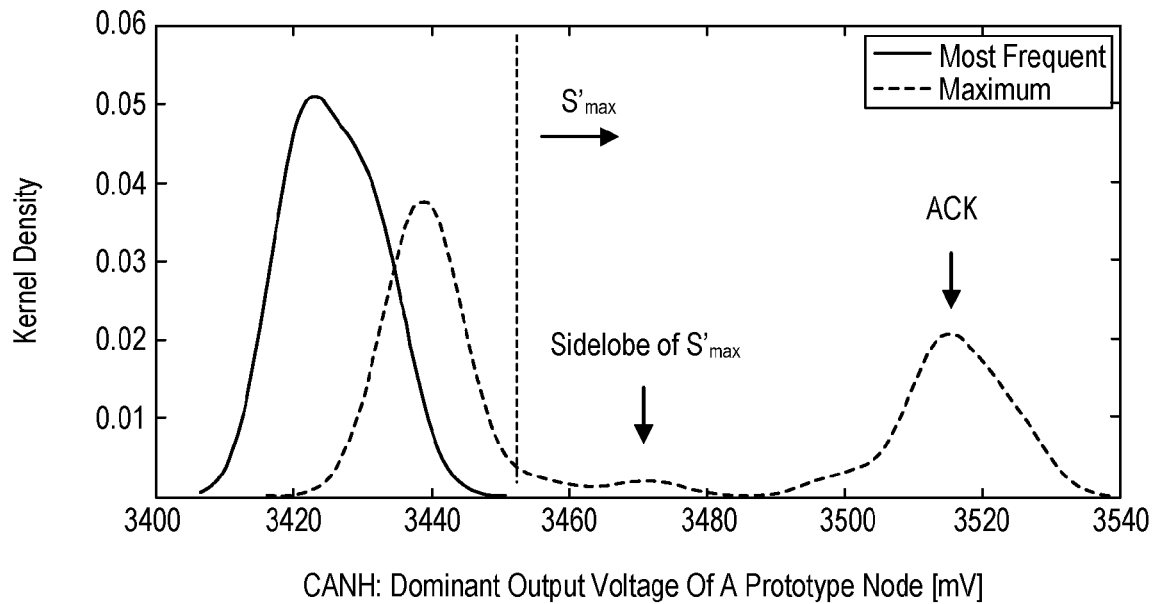
FIG. 9 is a graph showing most frequent and maximum set of CANH dominant voltages obtained from a CAN bus prototype.

FIG. 9 shows the kernel density plots of the most frequent and the maximum set of the measured dominant voltages from the CANH line. The measurements were obtained by running the proposed detection scheme on a CAN bus prototype. One can see that only for the maximum set, there exists a side lobe; whereas, the most frequent set resembles a Gaussian distribution. Note that during the N rounds of M measurements, the most frequent and the maximum values can be different.

One embodiment for deriving an ACK threshold is as follows. During the learning phase, a set of most frequency values along with a set of maximum values is extracted from voltage measurements made on the vehicle bus. A statistical distribution is then plotted for both sets. As seen in FIG. 9, the statistical distribution of the set of maximum values will include a primary peak and a secondary peak that has a peak value less the peak value of the primary peak. In the example embodiment, the secondary peak is partitioned from the primary peak using the correlation between the primary peak and the set of most frequent values. For example, the value for a discard threshold is set in relation to the statistical distribution for the set of most frequent values, where voltage measurements below the discard threshold are discarded. Specifically, the discard threshold is set at max $(S_{freq})+B\sigma_{S_{freq}}$, where $\sigma_{S_{freq}}$ denotes the standard deviation of set $S_{freq}$, and B is a design parameter determining how aggressive one wants be in discarding ACK voltages. Note that such a value also represents the rightmost end-point of the most frequent set's kernel density (e.g., dotted line shown in FIG. 9). Because the primary peak closely correlates to the peak of the most frequent values, the secondary peak is partitioned from the primary peak by discarding voltage measurements below the discard threshold. The usual side lobe of the maximum set ($S_{max}$) now becomes the main lobe of a refined maximum set, ($S'_{max}$). That is, the remaining lobe is the secondary peak in the statistical distribution.

Given the voltage measurements associated with the secondary peak, the value for the ACK threshold can be set as a function of the median or mean of these values associated with the secondary peak. From $S'_{max}$, the proposed detection scheme determines $\Gamma_1$=median($S'_{max}$)−3MAD($S'_{max}$) and $\Gamma 2=\mu s'_{max}-3\sigma s'_{max}$, where MAD(x) denotes the median absolute deviation of x, and $\mu_x$ its mean. In the example embodiment, the CANH ACK threshold of the given message ID (or its transmitter), $\Gamma_{ACK}^H$, is derived as $\Gamma_{ACK}^H$=max($\Gamma_1, \Gamma_2$). The maximum of the two can be taken to be conservative in discarding any non-ACK voltages. Moreover, not only the lower 3-sigma limit but also the lower 3-MAD limit is used since the refined maximum set $S'_{max}$ may still contain its own (new) side lob as shown in FIG. 9, i.e., an outlier for $S'_{max}$. Median absolute deviation (MAD) is a robust statistic, which is more resilient to outliers in a data set than the standard deviation although other metrics are also contemplated by this disclosure.

Through these processes, the ACK threshold of the example in FIG. 9 is determined as $\Gamma_{ACK}^H$=3.499V−a point where the two lobes in the maximum set are separated. Note that depending on the transmitter ECU, the ACK threshold can be different as the set of responders is different. Thus, ACK learning is done for all message IDs of interest. When deriving $\Gamma_{ACK}^L$ (for CANL, the minimum set instead of the maximum set as well as the upper instead of the lower 3-sigma and 3-MAD limits are used.

Once ACK thresholds, $\Gamma_{ACK}^H$ and $\Gamma_{ACK}^L$, of the given message ID are learned, the proposed detection scheme collects and selects dominant voltages that are outputted solely by the message transmitter. That is, the proposed detection scheme discards/ignores any CANH voltages that are lower than 2.75V or higher than $\Gamma_{ACK}^H$, and any CANL voltages that are higher than 2.25V or lower than $\Gamma_{ACK}^L$. In this way, the proposed detection scheme selects and further processes only the non-ACK voltages. In the example of FIG. 7, only {3.4V, 3.5V} from the measured {3.4V, 2.6V, 2.5V, 3.5V, 3.8V} would be selected as voltage outputs from the transmitter, i.e., non-ACK voltages.

Figure 10:
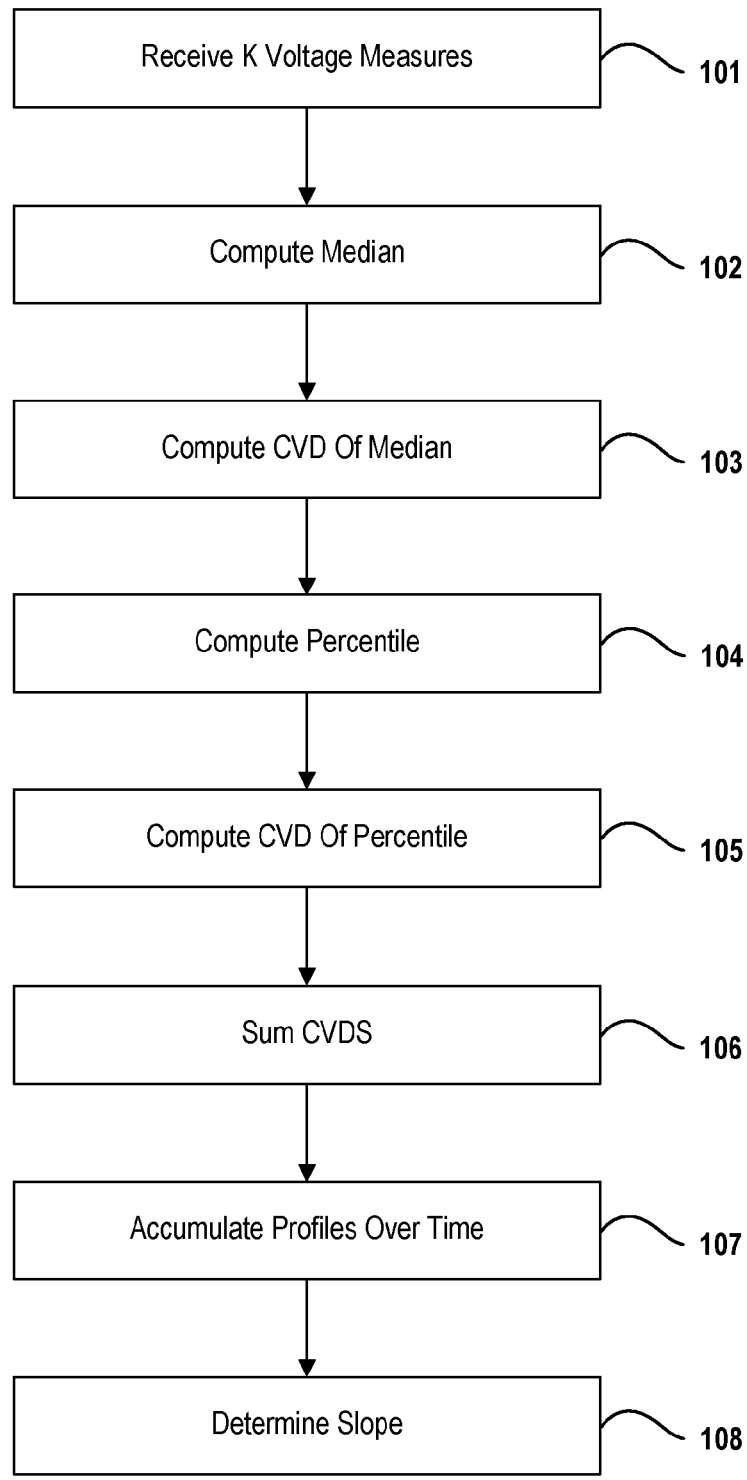
FIG. 10 is a flowchart depicting an example technique for constructing a voltage profile.

FIG. 10 depicts an example embodiment for constructing a voltage profile (i.e., fingerprint) for an ECU. A voltage instance is a set of features that reflects the ECUs voltage output behavior and is derived from non-ACK voltage measurements output by the ECU. To derive a voltage instance, k new measurements of non-ACK voltages are collected from the two wires forming the vehicle bus (i.e., CANH and CANL) as indicated at step 101. In the example embodiment, k is fifteen (15) although more or less measurements may be used for each measurement grouping.

From the group of voltage measurements, one or more features are determined. In the example embodiment, the features are a median of the voltage measurements in the group and one or more percentiles for the voltage measurements in the group as indicated at step 102 and 104. More specifically, the features $F_1$-$F_6$ are defined as:
 $F_1$. the most frequent CANH value (out of K values);
 $F_2$. the most frequent CANL value (out of K values);
 $F_3$. $75^{th}$ percentile of the transmitter's CANH outputs;
 $F_4$. $25^{th}$ percentile of the transmitter's CANL outputs;
 $F_5$. $90^{th}$ percentile of the transmitter's CANH outputs; and
 $F_6$. $10^{th}$ percentile of the transmitter's CANL outputs.
Similar to the learning phase, the proposed detection scheme determines the most frequently measured values from CANH and CANL. However, since the proposed detection scheme knows the CANH and CANL ACK thresholds, the main differences here are that only non-ACK voltages as well as less of them (i.e., $\kappa$<N) are used in determining the most frequent value. From the most frequent values, the proposed detection scheme obtains a rough estimation of the median of the transmitter's CANH/CANL dominant voltages.

Figure 11:
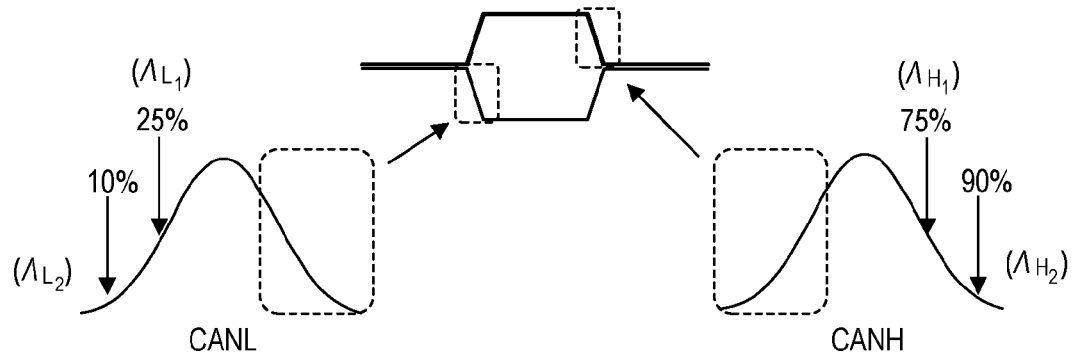
FIG. 11 is a diagram illustrating tracking the dispersion of CANH and CANL outputs.

The proposed detection scheme also keeps track of the dispersions of CANH and CANL dominant voltages. As the transmitter's voltage output behavior can change over time (due to changes in temperature, load, etc.), the proposed detection scheme continuously updates four different tracking points, $\{\Lambda_{H_1}, \Lambda_{H_2}, \Lambda_{L_1}, \Lambda_{L_2}\}$ points which estimate and thus reflect $\Lambda_{H_1}$: $75^{th}$; $\Lambda_{H_2}$: 90th percentile of the transmitter's CANH outputs; $\Lambda_{L_1}$: 25th, and $\Lambda_{L_2}$: 10th percentile of the CANL outputs, as shown in FIG. 11. By keeping track of how the transmitter's voltage distribution may look like, the proposed detection scheme understands what the transmitter's momentary voltage output behavior is. Thus, one can say that voltage instances represent those momentary behaviors. Note that since ACK voltages can distort the proposed detection scheme's understanding of transmitters' behaviors, it is important to go through the ACK threshold learning phase.

The reasons for keeping track of different percentiles for CANH and CANL are that the low percentiles for CANH would contain voltage outputs measured when the transmitter transits from sending a recessive bit to sending a dominant bit, and vice versa. The same applies for the high percentiles of CANL measurements. Although other percentiles can be tracked as well, to minimize the proposed detection scheme's overhead, the example embodiment only tracks $\{\Lambda_{H_1}, \Lambda_{H_2}, \Lambda_{L_1}, \Lambda_{L_2}\}$.

Algorithm 1 describes one technique for how the tracked dispersions are updated whenever the proposed detection scheme acquires K dominant voltages from each of CANH and CANL. Using the past $\kappa$N measurements, as in line 2, the proposed detection scheme roughly estimates what percentile, P, the current tracking point, $\Lambda$, represents. Then, to correct and thus move the tracking point $\Lambda$ to the desired position—where it represents the P* (not P) percentile—an adjustment of $\alpha(P^*-P)^3$ is made as in line 3, where $\alpha$ is a design parameter deciding on the sensitiveness to changes. With the adjustment function proportional to $(P^*-P)^3$, the tracking points move faster if they are far away from their desired positions. As a result, the four tracking points move if the transmitter's voltage distribution shows changes in its mean or variance, i.e., changes in its voltage output behavior.

| Dispersion Update Algorithm |
|---|
| 1: function UPDATEDISPERSION (V, Λ, P*) |
| 2: $P \leftarrow \dfrac{\#(V < \Lambda)}{\#V}$ ▶ Identify current tracking position |
| 3: return $\Lambda \leftarrow \Lambda + \alpha(P^* - P)^3$ ▶ Tracking point adjustment |
| 4: end function |
| 5: if #measured CANH voltages ≥ $\kappa$ and CANL voltages ≥ $\kappa$ then |
| 6: $V_H, V_L \leftarrow$ {past $\kappa$ N measurements from CANH, CANL} |
| 7: $\Lambda_{H_1} \leftarrow$ UPDATEDISPERSION($V_H$ $\Lambda_{H_1}$, 0.75) |
| 8: $\Lambda_{H_2} \leftarrow$ UPDATEDISPERSION($V_H$ $\Lambda_{H_2}$, 0.9) |
| 9: $\Lambda_{L_1} \leftarrow$ UPDATEDISPERSION($V_L$ $\Lambda_{L_1}$, 0.25) |
| 10: $\Lambda_{L_2} \leftarrow$ UPDATEDISPERSION($V_L$ $\Lambda_{L_2}$, 0.1) |
| 11: end if |

Instead of using tracking points for the percentiles, it is also feasible to directly derive the percentiles from the $\kappa$N values. The proposed detection scheme, however, does not do it in that way since it may introduce incorrectness if K is low, i.e., insufficient samples in deriving the percentiles, thus making it too sensitive to temporary changes. Thus, in order to make the proposed detection scheme work under various circumstances, percentiles are tracked instead.

A voltage instance ($F_1$-$F_6$) represents the momentary voltage output behavior of the message transmitter. So, to log the transmitter's usual behavior, exploiting every newly derived voltage instance, the proposed detection scheme constructs/updates the voltage profile of the message transmitter. Although the voltage instances are derived "per message ID", if messages originate from the same transmitter/ECU, their instances are near-equivalent, thus leading to construction of the same voltage profile. Evaluations show that there exists only one voltage profile for a given transmitter/ECU, thus enabling fingerprinting.

Returning to FIG. 10, exploiting a newly derived voltage instance, the proposed detection scheme next computes or updates the cumulative voltage deviations (CVDs) of features $F_1$-$F_6$ as indicated in steps 103 and 105. CVD is defined to represent how much the message transmitter's dominant voltages deviated cumulatively from their ideal values. Thus, for feature $F_x$, CVD at step n, $CVD_x[n]$, is updated as:

$$CVD_x[n]=CVD_x[n-1]+\Delta[n](1-v_x[n]/v_x^*), \qquad (2)$$

where $\Delta[n]$ is the elapsed time since step n−1, $v_x[n]$ the value of feature $F_x$ at step n and $v_x^*$ the ideal/expected value of $v_x$. Ideally, the most frequently measured as well as any percentiles of the CANH and CANL dominant voltages should be equal to 3.5V and 1.5V, respectively, i.e., no variations in their output voltages. Therefore, for features $\{F_1, F_3, F_4\}$, which represent CANH values, $v_{\{1,3,4\}}^*$=3.5V and similarly for features $\{F_2, F_5, F_6\}$, $v_{\{2,5,6\}}^*$=1.5V.

As different ECUs have different $V_{CC}$, ground, and instantaneous $R_{DSON}$ values, they output different CANH and CANL dominant voltages. Their voltage instances would therefore be different, and hence the trends in their CVD changes would also become different from each other. So, for every obtained CVDs of features $F_1$-$F_6$, the proposed detection scheme derives a metric $\Psi[n] = \Sigma_{x=1}^{6}[n]$ as indicated at step 106, where $\Psi[n]$ is the total sum of the CVDs for the six features. The reason for the proposed detection scheme's summing of all the CVDs is to exploit ¶ 4. Recall from above that ¶ 4 indicates that transient deviations in CANH and CANL output voltages are opposite in direction. Accordingly, via CVD summation, the proposed detection scheme suppresses any transient deviations that have occurred (due to changes in driver control, temperature, etc.) when constructing and updating the voltage profiles. It is important to note that since CAN is a differential bus, $F_2$, $F_4$, $F_6$ suppresses $F_1$, $F_3$, $F_5$, respectively.

Suppression of transient changes yields a value, $\Psi$, that (mostly) represents the consistent factors in the voltage instances: $V_{CC}$, ground voltages, and the usual voltage drops across the transistors. As discussed in ¶ 5, since these values are rather constant, the accumulated sum of $\Psi$, $\Psi_{accum}[n] = \Sigma_{k-1}^{n}\Psi[k]$ becomes linear in time. Moreover, from ¶ 1-¶ 3, as $\Psi$ values are distinct for different ECUs, the trends in how $\Psi_{accum}$ changes also become different, i.e., the slopes in a $\Psi_{accum}$-time graph are different. Therefore, the proposed detection scheme formulates a linear parameter identification problem as:

$$\Psi_{accum}[n] = Y[n] \cdot t[n] + e[n], \quad (3)$$

where at step n, Y[n] is the regression parameter, t[n] the elapsed time, and e[n] the identification error. As the regression parameter Y represents the slope of the linear model and varies with the transmitter, this is defined as the voltage profile (i.e., fingerprint). The Recursive Least Squares (RLS) algorithm is used to determine the voltage profile Y and aims to minimize the sum of squares of the modeling errors and thereby learn the regression parameter. Note that the choice of algorithm does not affect the proposed detection scheme's performance and other types of algorithms, such as least mean squares, also falls within the scope of this disclosure. In the example embodiment, kilosecond ($=10^3$ secs) is used as the unit for t. It is shown below that the thus-derived voltage profile Y is indeed constant over time and also distinct for different ECUs, thus allowing the proposed detection scheme to correctly fingerprint the message transmitter.

Newly obtained voltage measurements are used to update the voltage profile. Upon receiving k new voltage measurements, the process set forth above is repeated and the voltage profile is updated. This process is summarized with reference to FIG. 10. First, newly obtained voltage measurements are grouped into groups of voltage measurements at 101. For each group of voltage measurements, a median of the voltage measurements in the group of voltage measurements is computed at 102 and one or more percentiles for the voltage measurements in the group of voltage measurements are computed at 104. At each step or iteration, a cumulative deviation of the median of the voltage measurements is computed at 103, and a cumulative deviation for each of the percentiles of the voltage measurements is computed at 105. A voltage profile may be formed at 106 by summing the cumulative deviation of the median of the voltage measurements with the cumulative deviation of the one or more percentiles of the voltage measurements. For a more robust voltage profile, the values for the voltage profiles are accumulated at 107 across groups of voltage measurements such that the voltage profile is further defined at 108 as the slope of the accumulated values. The proposed detection scheme can construct a voltage profile for a given message ID, regardless of how that message was injected (periodically/aperiodically), fingerprint the transmitter, and thus achieve root-cause analysis and even intrusion detection.

Despite its accuracy under most conditions, there could exist corner cases where the output voltage profiles of the proposed detection scheme can be insufficient. For example, two different ECUs might have near-equivalent voltage profiles, i.e., collision in voltage profiles, in the first place, or the proposed detection scheme may not be 100% sure on the source of attack, although its scope has been reduced. Therefore, in such cases where further verification is required, the proposed detection scheme exploits the (momentary) voltage instances as inputs for multi-class classification techniques (e.g., Random Forest, SVM). That is, $F_1$-$F_6$ are used as their features. When using these features for classification, the proposed detection scheme can benefit from the following advantages and thereby verify its results.

Depending on the variations of each ECU, some of $F_1$-$F_6$ may (or may not) provide more distinctiveness than others, when trying to distinguish two or more transmitters, i.e., their voltage output behaviors. For example, in distinguishing ECU Ⓐ and Ⓑ, feature $F_1$ may only help; whereas, when distinguishing Ⓐ and Ⓒ, features $\{F_2, F_4\}$ may only help. Therefore, Random Forest was used as a classifier, which is an ensemble approach that builds multiple decision trees as base learners, since it performs an internal feature selection step, the more effective feature(s) in distinguishing a pair of transceivers can be determined.

In contrast to the fact that the proposed detection scheme's voltage profile looks at the trend in changes via multiple voltage instances, classification techniques use singular voltage instance as the input and observe in a momentary manner. In addition, since Random Forest has multiple base learners providing various decisions, the voltage instance can be looked from various dimensions. So, even when there is a collision in voltage profiles, the proposed detection scheme can further verify and resolve such a problem via running classification techniques, since they look at voltage output behaviors differently. Even in the worst case of still having collisions, the proposed detection scheme has at least managed to reduce the scope of identifying the attacker.

Despite the various advantages of using classification techniques, it would be difficult to consider them as an alternative (rather than a supplement) to voltage profiles, since there remain challenges in terms of overhead, training the system (securely), etc. Therefore, machine learning techniques are used only for the purpose of verification, thus supplementing the proposed detection scheme's voltage profiles. In other words, in the proposed detection scheme, the classification techniques are only triggered and used when there is some ambiguity in the proposed detection scheme's results and when there are assurances on a secured training set, although in most cases voltage profiles from the proposed detection scheme are sufficient for the purpose of root-cause analysis, intrusion detection, etc. Machine learning techniques using the proposed detection scheme's voltage instances can supplement the proposed detection scheme's voltage profiles efficiently, thus reducing possible false positive/negatives will be shown below.

The core of root-cause analysis is to obtain fingerprints of ECUs/transmitters. The proposed detection scheme achieves this by obtaining their distinct voltage profiles. Hence, the voltage profile changes under the considered fabrication, flood and masquerade attacks as follows, thus enabling a root-cause analysis.

Suppose the adversary ECU A is mounting fabrication attack with forged ID=X, where X is also sent by some victim ECU B. Before the attack, voltage profiles of message ID=X would only be updated via dominant voltages from ECU B. However, if a high-frequency fabrication attach is mounted, much more output voltages from A would be processed than those from B when updating voltage profile of X. Accordingly, the voltage profile would change from reflecting only B's behavior to mostly A's. Thus, by observing the profiles, the proposed detection scheme can know that the attack was mounted by ECU A, i.e., a root-cause analysis.

If a low-frequency attack is mounted on message ID=X, its profile would represent equally A's and B's behavior or mostly B's. Even in such a case, since one knows (via state-of-the-art IDSs), whether the received message is an intrusion or not (but unfortunately not its source), voltage measurement from only attack messages can be filtered out and considered in constructing a new intrusion voltage profile, and thus be used for identifying the attack source. Refer to an intrusion voltage profile as the one which reflects only the attacker's voltage output behavior. The same can also be applied for high-frequency attacks, although there is not much difference.

In the case of flood attack, since the forged ID value is not usually used by other ECUs, i.e., misuse of ID, it can easily be detected. Therefore, similarly to how one achieves root-cause analysis for low-frequency fabrication attacks, only the voltage measurements from the attack messages can be considered in constructing the intrusion voltage profile, and then exploited for the root-cause analysis.

Under the masquerade attack, at the time $T_{masq}$ of attack, the adversary A starts injecting message ID=X instead of the original transmitter B. In such a case, before $T_{masq}$, the voltage profile of message X would reflect only the original transmitter B's voltage output behavior. However, after $T_{masq}$, the profile would reflect only A's behavior. Thus, by looking at the new voltage profile, one can tell that the adversary mounting masquerade attack is ECU A.

Although the main purpose of the proposed detection scheme is root-cause analysis, it can also be used in supplementing other IDSs. As the detection scheme can fingerprint the transmitters, it is capable of detecting adversaries that impersonate ECUs which usually send aperiodic messages. Moreover, even for periodic messages, which existing IDSs analyze injection timings to detect attacks on them, the proposed detection scheme looks at intrusions from a very different aspect: the dominant voltages output by CAN ECUs.

Similarly to what has been discussed for root-cause analysis, under all three attacks, the voltage profile shows a sudden change in its trend. In other words, while the voltage profile ($\Upsilon$), i.e., the slope of $\Psi_{accum}$-time graph, should remain constant, an abnormal level of fluctuation or a change occurs to it. Even when classification is used as an alternative to the voltage profiles, the trained classifier would suddenly show an abnormally high rate of misclassification when the attack is mounted, thus indicating an intrusion.

The practicability and efficiency of the proposed detection scheme is evaluated in two real vehicles. When running the proposed detection scheme for both evaluation settings, in the learning phase, M=30 dominant voltages were obtained for each message ID for N=50 rounds. Once the ACK threshold is learned, the voltage instances were outputted whenever κ=15 measurements of non-ACK voltages from both CANH and CANL were acquired.

CAN bus prototype is configured with four nodes connected to each other via a 2-wire bus. Each node consists of an Arduino UNO board, which is based on the ATmega328 microcontroller, and a SeeedStudio CAN bus shield stacked on top of it. The CAN bus shield consists of a Microchip MCP2515 CAN controller and a MCP2551 CAN transceiver to provide CAN bus communication capabilities. Only two of the four nodes are configured to have a 120Ω terminal resistor so as to match the required load resistance of $R_L$=60Ω.

The three prototype nodes A, B, and C were programmed to inject messages 0x01, 0x07, and 0x15 at random message intervals within [20 ms, 200 ms]. The fourth prototype node V was programmed to run the proposed detection scheme and construct voltage profiles for messages 0x01, 0x07, and 0x15 (i.e., transmitters A, B, and C), respectively. The reason for injecting the messages aperiodically is to show that even in such cases, the proposed detection scheme is capable of fingerprinting the transmitters, whereas existing approaches cannot. This capability is essential for root-cause analysis.

For the monitor node V that runs the proposed detection scheme as shown, its CANH and CANL lines were not only connected to the bus but also to the microcontroller's ADC (Analog-to-Digital Converter). The ADC on the Arduino UNO had 10-bit resolution and was configured to sample voltages at the rate of 50,000 samples/sec. This way, V acquired measurement of dominant voltages on the bus when the other three nodes (A, B, and C) were sending their messages. The CAN bus prototype was set up to operate at 500 Kbps, which is typical for in-vehicle, high-speed CAN buses.

Two cars, 2013 Honda Accord and a 2015 Chevrolet Trax, were also used for the experimental evaluation of the proposed detection scheme. Through the OBD-II system port, the proposed detection scheme prototype node (V) to the in-vehicle CAN networks were connected, both running at 500 Kbps. From a laptop and through the proposed detection scheme node, messages were received and read from the 2013 Honda Accord's and the 2015 Chevrolet Trax's CAN buses. More importantly, while the proposed detection scheme was receiving the messages from the two vehicles, it measured their CANH and CANL voltage levels and then derived their ECUs' voltage instances and profiles. As in the CAN prototype setting, the proposed detection scheme sampled the in-vehicle CAN bus at the rate of 50,000 samples/sec.

Figure 12A:
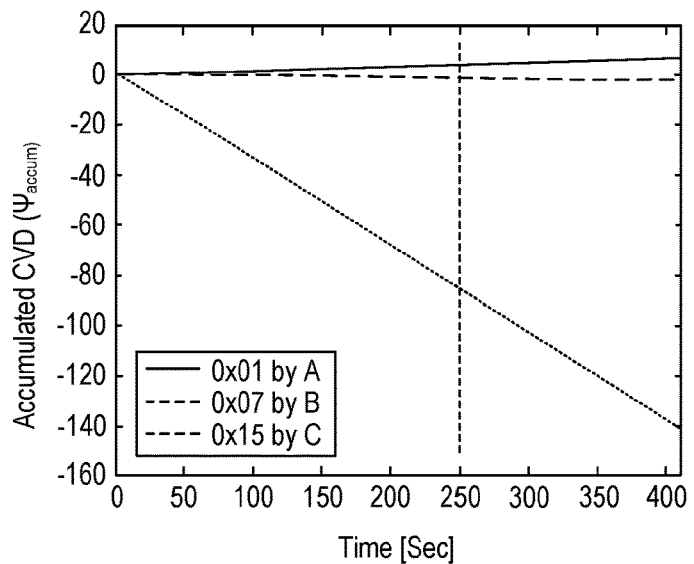
FIGS. 12A-12C are graphs showing voltage profiles obtained from the CAN bus prototype, a 2013 Honda Accord, and a 2015 Chevrolet Trax, respectively.

FIG. 12A shows the voltage profiles of all the three messages sent on the CAN prototype bus. One can see that, although the three CAN prototypes nodes were composed of same hardware (CAN shield and a micro-controller), the corresponding message IDs showed different trends in how their $\Psi_{accum}$ changed over time, since the three ECUs differ in their supply and transistor characteristics. Based on the RLS implemented in the proposed detection scheme, it was found that nodes A, B, and C had different voltage profiles ($\Upsilon$) being equal to 16.1, −343.4, and −5.6, respectively. In other words, the voltage profiles of messages 0x01, 0x07, and 0x15 were shown to be different from each other as they were sent by different ECUs, thus verifying the feasibility and accuracy of the proposed detection scheme.

In the CAN bus prototype, one knew which ECU is sending which message(s), but it is difficult to know this information in a real vehicle. In order to obtain the ground truth on which message(s) were sent by an ECU, the schemes were exploited, which analyzed patterns in in-vehicle network traffic (i.e., message timings) for finger-printing the ECUs. Note, however, that these are used only for obtaining the ground truth, not for root-cause analysis or intrusion detection, as those schemes won't work if the attack messages are injected at random times.

Through the connected the proposed detection scheme node, the CAN traffic of the 2013 Honda Accord was logged but also measured the dominant voltages from its CAN bus. The measurements were made on a stationary vehicle, but while continuously changing their operations, such as pressing brake pedal, turning the steering wheel, turning on/off lights, etc. By logging the CAN traffic and exploiting schemes, messages {0.091, 0x1A6} to verify were sent from some ECU 𝔸, {0x309} from 𝔹, {0x191, 0x1ED} from ℂ, and {0x1EA, 0x1D0)} from 𝔻.

Figure 12B:
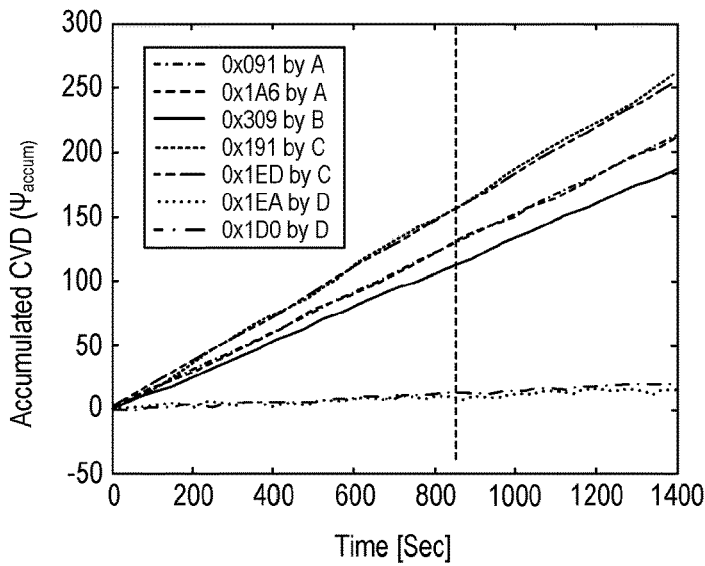

FIG. 12B shows the voltage profiles obtained for these messages. The voltage profiles (ϒ) derived by the proposed detection scheme are shown to be equivalent only for those messages sent from the same ECU; ECU 𝔸 sending {0.091, 0x1A6) had ϒ 𝔸 =146.6, 𝔹 sending {0x309} had ϒ 𝔹 =132.7, ℂ sending {0x191, 0x1 ED} had ϒ ℂ =182.0, while 𝔻 sending {0x1EA, 0X1 D0} had ϒ 𝔻 =14.3. This result again shows that voltage profiles for different ECUs are different and can thus be used as their fingerprints.

To further verify that the proposed detection scheme's capability of fingerprinting is not restricted to a specific vehicle model, the proposed detection scheme was also run on a 2015 Chevrolet Rax. As in the Honda Accord, the measurements were conducted on a stationary vehicle. Again, by exploiting the schemes, one obtained the ground truths of messages (0x1FC, 0x362) sent from ECU, {0x19D, 0x199}, by 𝔹, {0x348} from ℂ, and {0x1 E9} from 𝔻.

Figure 12C:
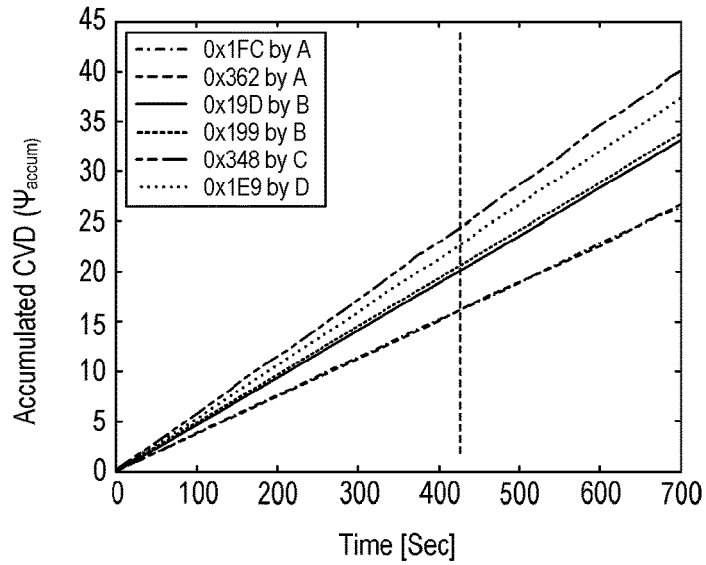

FIG. 12C shows the result of the proposed detection scheme determining that {0x1FC, 0x362} have a voltage profile of ϒ 𝔸 =37.9, (0x19D, 0x199) have ϒ 𝔹 =48.2, {0x348} has ϒ ℂ =57.4, and (0x1E9) has ϒ 𝔻 =53.3. Thus, using voltage measurements, the proposed detection scheme correctly fingerprinted their transmitters.

This again affirms the diversity of voltage profiles (of different ECUs), thus facilitating the proposed detection scheme's to fingerprinting of in-vehicle ECUs. Moreover, these results show that the proposed detection scheme's fingerprinting is not limited to a specific vehicle model, and can thus be applied to other vehicle models.

Five characteristics, 𝕍 1-𝕍 5, which were imperative for the proposed detection scheme to derive the voltage instances and profiles, thus fingerprinting the transmitter ECUs were provided. 𝕍 1-𝕍 4 actually hold in real vehicles used for experiments was evaluated. Note that FIG. 12 verifies 𝕍 5, supporting the fact that the voltage profiles (Y) of ECUs were constant over time, i.e., linear.

According to 𝕍 1-𝕍 3, ECUs output (slightly) different dominant voltages since they have different $V_{CC}$, ground, and on-state resitances.

FIG. 13A plots features $F_1$-$F_2$ (i.e., the most frequently measured CANH and CANL values) for messages 0x309 (sent by m), 0x191 (sent by ℂ), and 0x1D0 (sent by 𝔻) outputted by the proposed detection scheme in the 2013 Honda Accord. For better visualization, the moving average of those values with the window size of 20 were plotted. Although the transceivers of all those messages are to output the agreed-on CANH=3.5V and CANL=1.5V when sending a dominant bit, they outputted values deviated from them. More importantly, their output levels were clearly discriminable. Even though ECU 𝔹, which sent 0x309, was shown to output similar CANH dominant voltages to ECU 𝔻, it outputted totally different voltages on CANL. One can also see that for 0x1D0 sent from 𝔻, there were transient changes, even after smoothing the data with the moving average. Moreover, those changes made its $F_1$ and $F_2$ values occasionally equivalent to others. Thus, exploiting momentary values, instead of their trends, for fingerprinting may incur false positives/negatives, although they help verify the results during machine learning verification.

Similarly, FIG. 13B plots $F_1$-$F_2$ values of 0x1FC (sent from 𝔸), 0x199 (sent from 𝔹), and 0x1E9 (sent from 𝔻) outputted by the proposed detection scheme in the 2015 Chevrolet Trax. Again, one can see that the transmitters of those messages did not output the desired levels, but outputted discernible levels. These results confirm that 𝕍 1-𝕍 3 hold even in real vehicles, thus facilitating the proposed detection scheme to fingerprint the transmitters.

Figure 14:
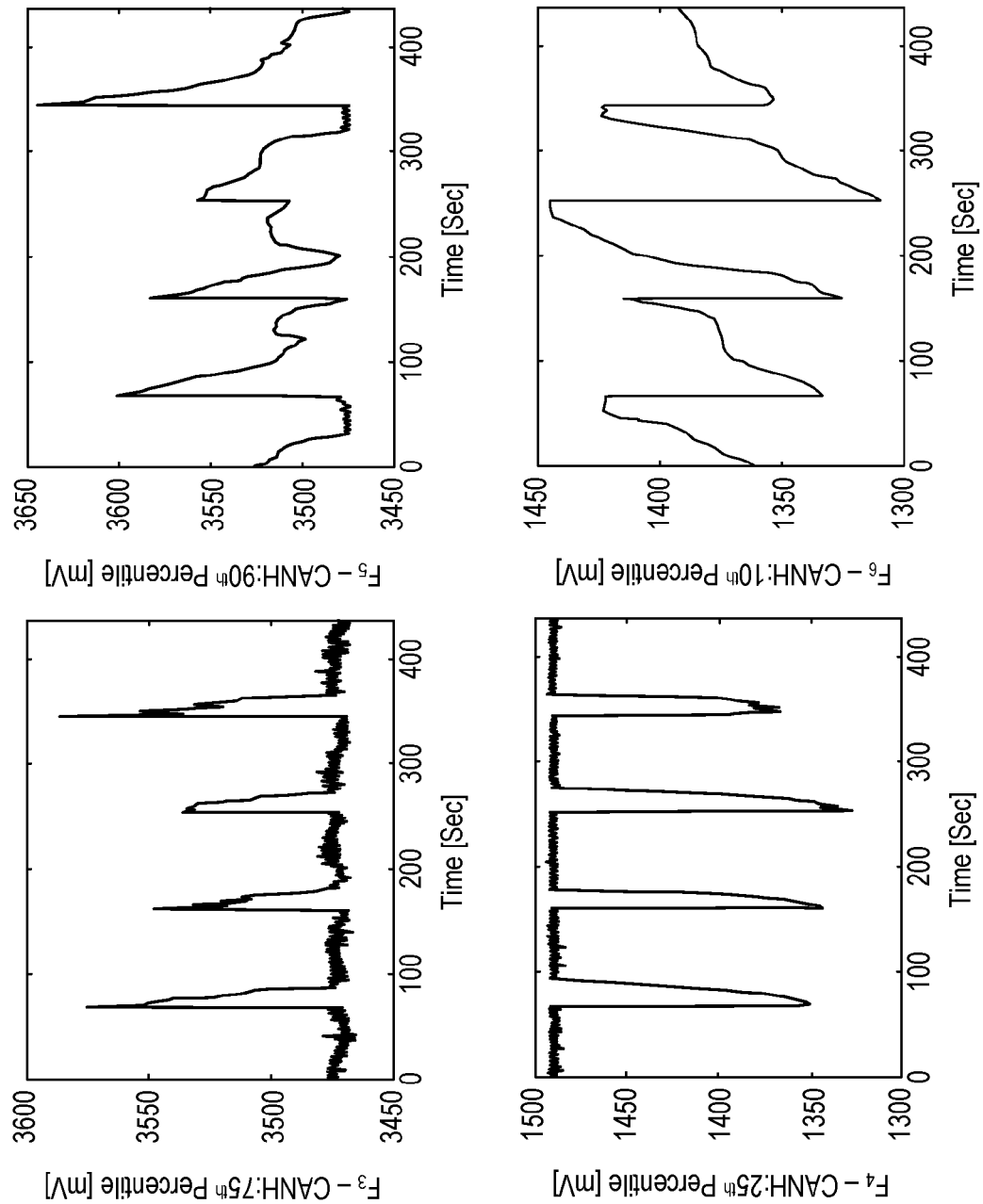
FIG. 14 are graphs showing transient changes of message 0x1D0 in the 2013 Honda Accord.

𝕍 4 states that transient changes in CANH and CANL dominant voltages are opposite in direction, and if summed up, their changes can be suppressed/cancelled. FIG. 14 shows $F_3$-$F_6$ values—i.e., the tracked 75th and 90th percentiles of CANH outputs and 25th and 10th percentiles of CANL outputs—of message 0x1 D0 in the 2013 Honda Accord. $F_3$-$F_6$ values are shown to temporarily deviate from and later return to their usual values. Since $F_3$ and $F_5$ are inverses of $F_4$ and $F_6$, respectively, vertically reversed shapes of the former resemble those of the latter. Thus, since CAN is a differential bus, summing up those features suppressed their transient deviations when driving the voltage profiles. Note, however, that since the tracked values in the proposed detection scheme depend on the time of sampling and its accuracy, the summation did not completely remove the deviations, but is sufficed for fingerprinting.

The proposed detection scheme's performance of root-cause analysis and intrusion detection in the CAN bus prototype and in a real vehicle when fabrication and masquerade attacks are mounted were evaluated. The results against the flood attack are omitted as they resemble those against the fabrication attack; there are changes only in the ID values. Moreover, for the purpose of more in-depth discussion, a focus is on the results obtained from the 2013 Honda Accord.

In the CAN bus prototype, ℂ is further programmed to be the attacker and mount a high-frequency fabrication attack on 𝔸 by injecting message 0x01 every 10 ms. Note that 0x01 is also being sent from the legitimate node 𝔸 at a random interval of 20-200 ms.

Figure 15:
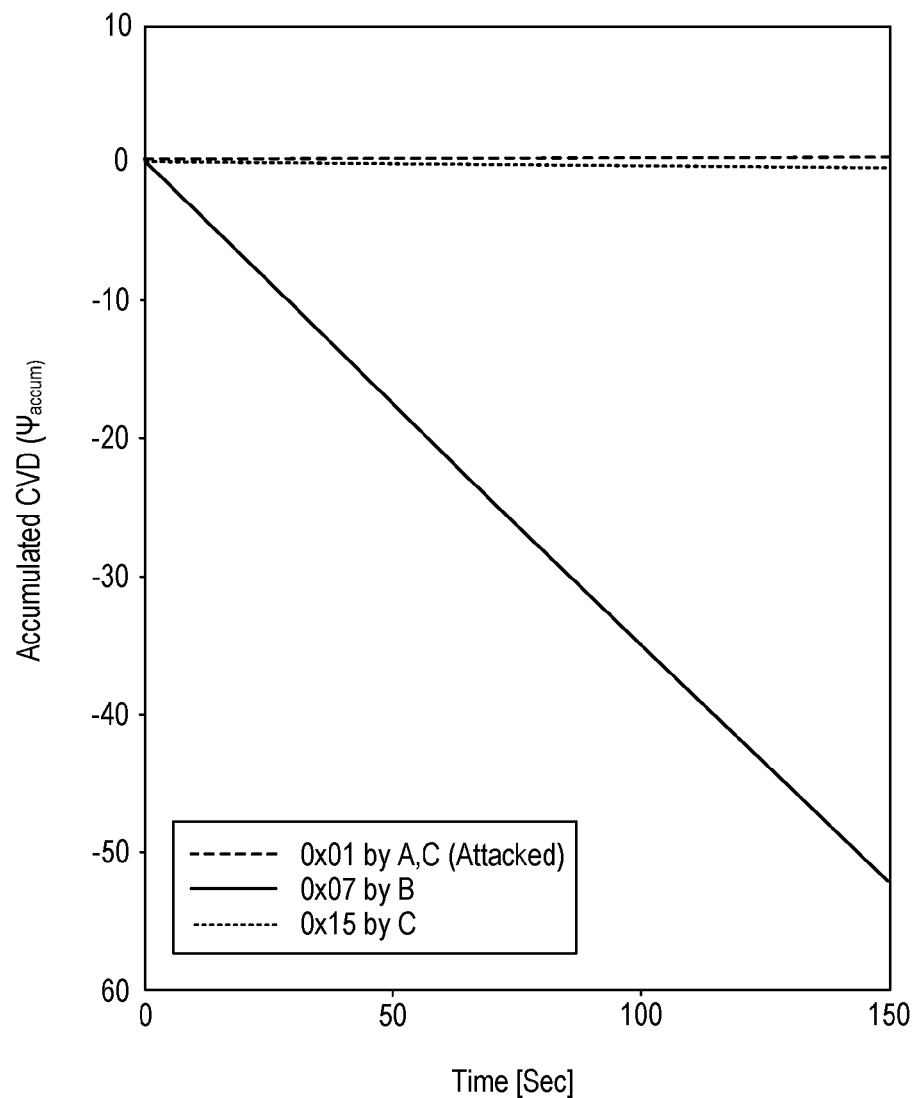
FIG. 15 is a graph showing the voltage profiles during a fabrication attack on the CAN bus prototype.

FIG. 15 shows the determined voltage profiles for all three messages during the mounted attack. One can see that the voltage profile for 0x01 has changed to a profile equivalent to the one shown in 0x15 and is different with FIG. 12A. As a result, the proposed detection scheme was shown to be able to determine that the transmitters of 0x01 and 0x15 is the same, thus identifying the source of the attack to be ECU ℂ. Based on the fact that the voltage profile has suddenly changed, the proposed detection scheme could also detect the existence of an intrusion. More importantly, the proposed detection scheme was able to detect the attacks mounted on aperiodic messages that existing solutions cannot handle. The masquerade attack will be analyze in more depth when discussing the real vehicle results.

To evaluate the proposed detection scheme against the fabrication attack in a real vehicle, a scenario in which the Honda Accord ECU 𝔹 is attacked by 𝔻 was considered. The prototype node V, which was connected to the vehicle and run the proposed detection scheme, outputs voltage instances and profiles of the monitored messages: 0x309 sent by B every 100 ms and {0x1EA, 0x1D0} sent by D every 20 ms. To generate a scenario of real ECU ID mounting a fabrication attack on real ECU B, V was programmed to record every 2n-th message of 0x1D0 as its ID to be 0x309 after time t=250 secs elapsed. Such a setting emulates a scenario where ECU D injects an attack message with forged ID=0x309 every 2×20=40 ms, i.e., more frequently than B. Note that every 100 ms the message 0x309 sent from B was also received.

Figure 16A:
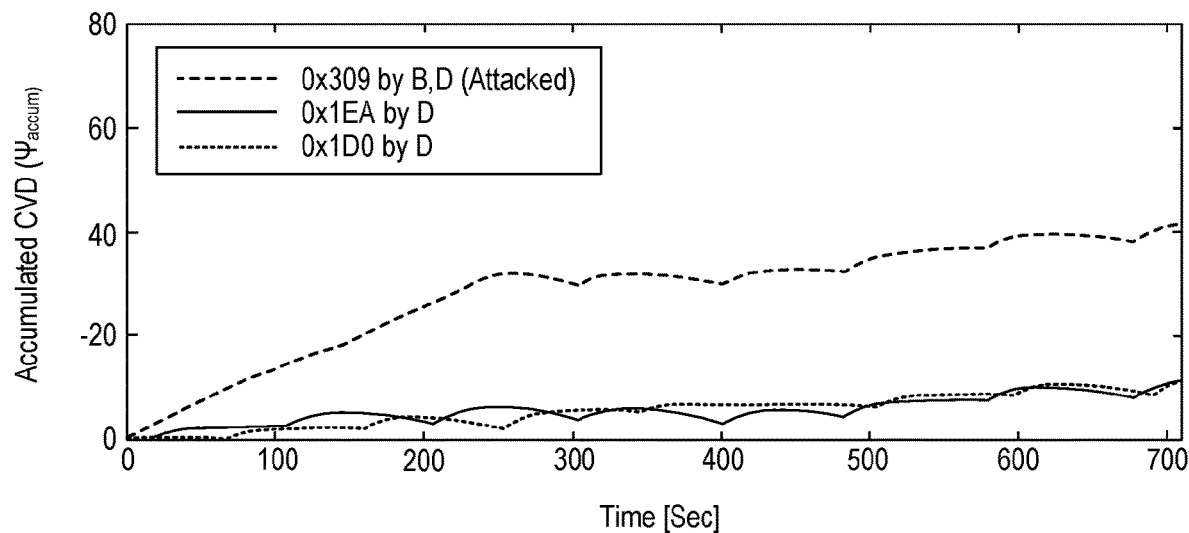
FIG. 16A is a graph showing the voltage profile before and after a fabrication attack.
Figure 16B:
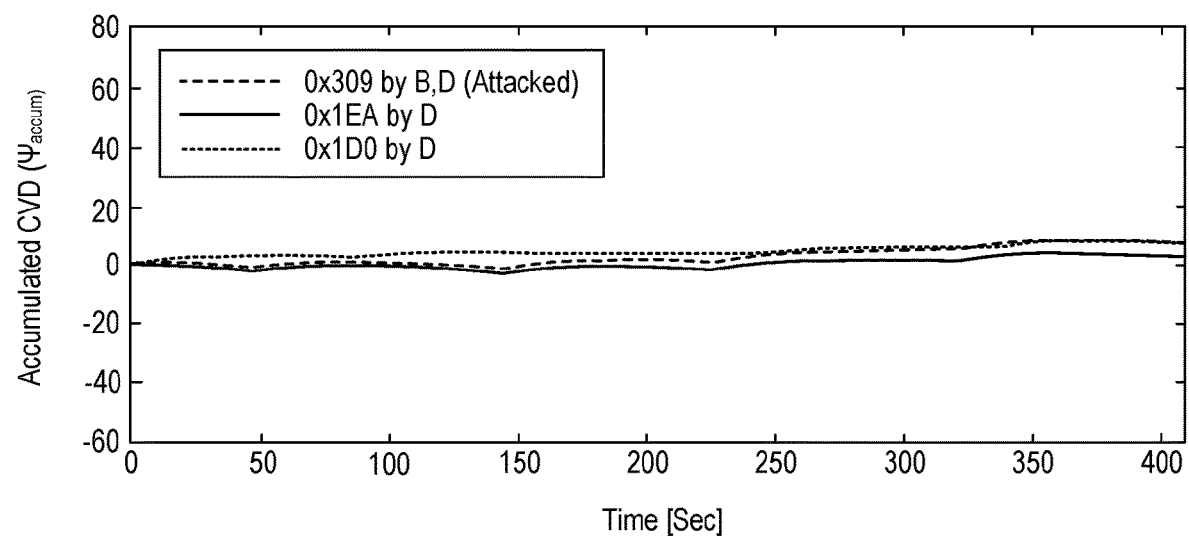
FIG. 16B is a graph showing the voltage profile during a fabrication attack.

FIG. 16A plots the voltage profiles of those messages. One can see that after t=250 secs, the voltage profile (i.e., the slope of the graph) of 0x309 changed suddenly. Thus, the proposed detection scheme was able to detect abnormal voltage outputs, thus determining that there was an intrusion. Even though the legitimate node B was still sending message 0x309 every 100 ms, since the attacker was sending it much more frequently, the voltage profile converged to the one that reflects the attacker as shown in FIG. 16B. During the attack, since the voltage profile of 0x309 matched the profiles of (0x1EA, 0x1D0), The proposed detection scheme concluded the attacker node to be D.

For the case of masquerade attack, the following scenario was considered: ECU A, which sent (0x091, 0x1A6) every 10 ms and 20 ms, respectively, mounts a masquerade attack on D, which sent {0x1EA, 0x1D0} every 20 ms. To generate such a scenario in the real vehicle, the prototype node V was programmed to stop receiving 0x1 EA, but interpret 0x1A6 as 0x1EA after t=730 secs. Since the message intervals of 0x1A6 and 0x1 EA were both 20 ms and sent from A & D, respectively, such a setting emulates a scenario where the transmitter of 0x1 EA changes from D to A, i.e., mounting a masquerade attack. Such a change in interpretation was achieved by programming V to modify its message filter from only accepting {0x091, 0x1EA} to only accepting {0x091,0x1A6}, but still record 0x1A6 as 0x1EA.

Figure 17A:
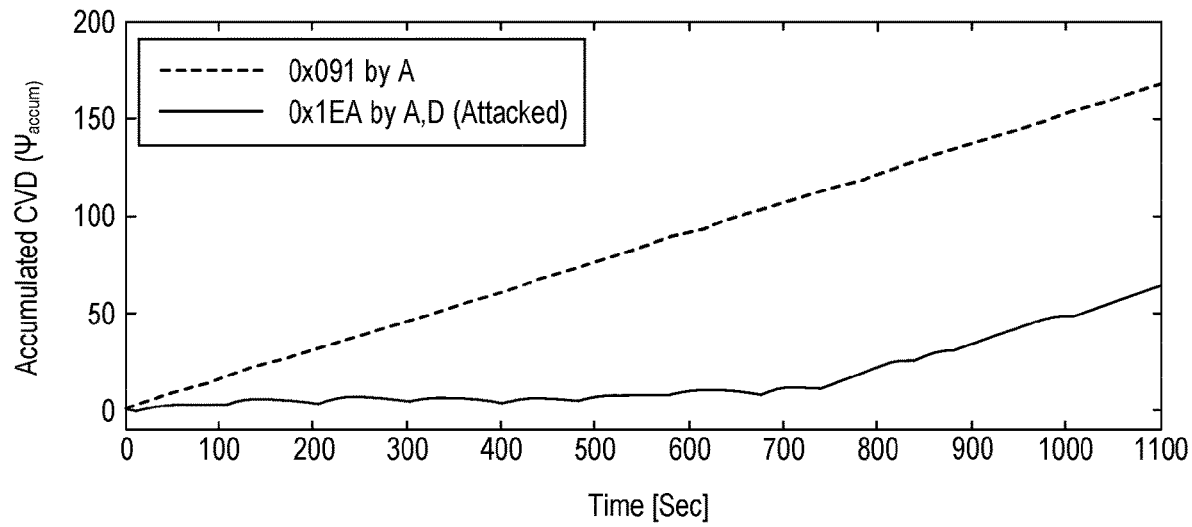
FIG. 17A is a graph showing the voltage profile before and after a masquerade attack.
Figure 17B:
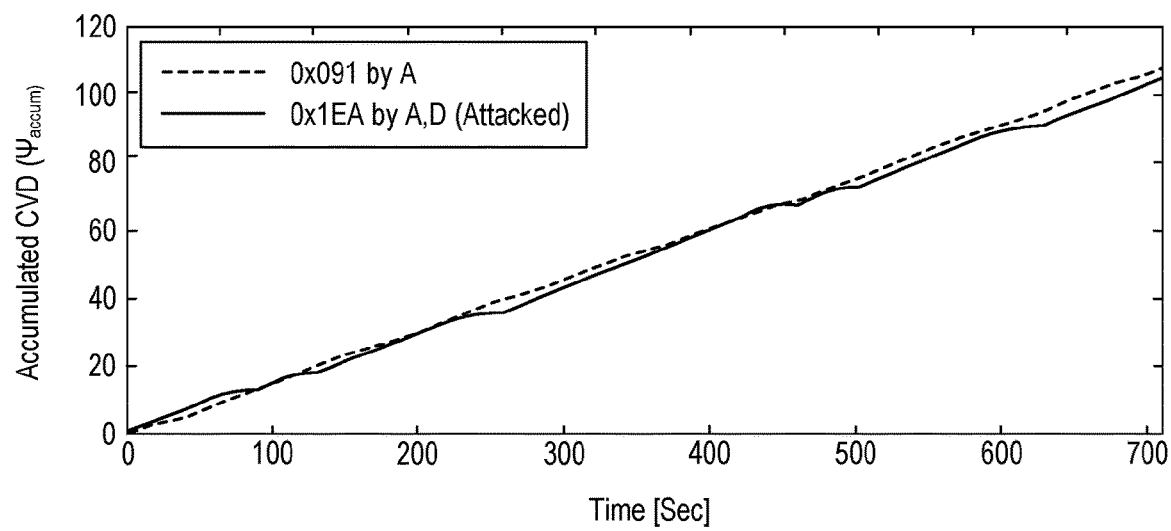
FIG. 17B is a graph showing the voltage profile during masquerade attack.

As shown in FIG. 17A, the voltage profile of the attacked message 0x1EA suddenly changed when masquerade attack was mounted on it. This was because the transmitter of that message changed. Similarly to the fabrication attack, the proposed detection scheme was able to detect the intrusion. FIG. 17B plots how the voltage profiles obtained during the attack. Since message 0x1EA's voltage profile matched the one to message 0x091 (sent by A), the proposed detection scheme was able to determine the source of the attack to be A, i.e., successful root-cause analysis.

Beside voltage profiles, the proposed detection scheme can also exploit voltage instances as inputs for classification techniques. Such an approach will allow for an analysis of attacks from a different vantage point—momentary behavior rather than its trend—and will thus help reduce false positives/negatives or resolve ambiguities.

To generate (on purpose) a case where false positives/negatives may incur, following scenario was considered in the real vehicle: ECU C, which sends 0x191 every 10 ms, mounts a low-frequency fabrication attack on message 0x309, which is sent every 100 ms from B. In generating such a scenario, the evaluation was set up similarly to the previous ones, except that the proposed detection scheme was programmed to receive only the 10n-th message of 0x191 and record its ID to be 0x309 in order emulate a low-frequency fabrication attack.

Figure 18A:
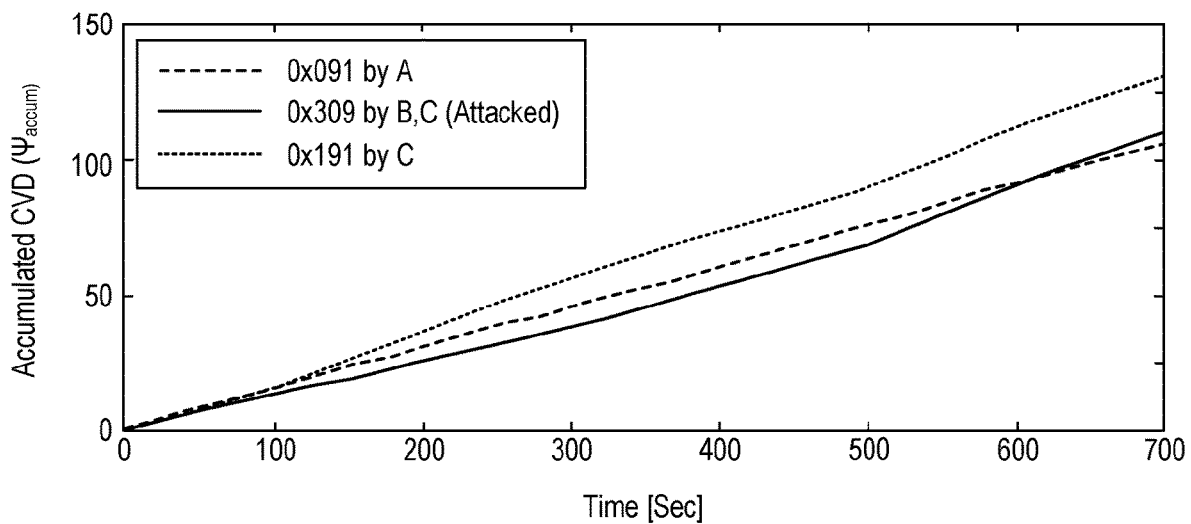
FIGS. 18A and 18B shows how machine learning verification helps reduce false positives/negatives in the proposed detection scheme.

FIG. 18A shows the voltage profiles of messages 0x091 (sent from A), 0x309 (sent from B and even C), and 0x191 (sent from C). Due to the low frequency of attack messages and voltage profiles of A & C being naturally similar, the voltage profile of the victim's message 0x309 showed a value that lies in between A's and C's profiles. Accordingly, the proposed detection scheme may get confused of which ECU actually mounted the low-frequency fabrication attack. Even for such a case, when the attack messages were filtered out and thus an intrusion voltage profile for it was constructed, the proposed detection scheme easily succeeded in root-cause analysis. However, to introduce some ambiguity in the decision, it was not performed in this evaluation. In such a case, the proposed detection scheme uses the momentary voltage instances as inputs for machine learning. In this evaluation, the Random Forest classifier with 20 base learners was used, and all the acquired data until detecting the intrusion (approximately 50% of the data) was used as the training set.

Figure 18B:
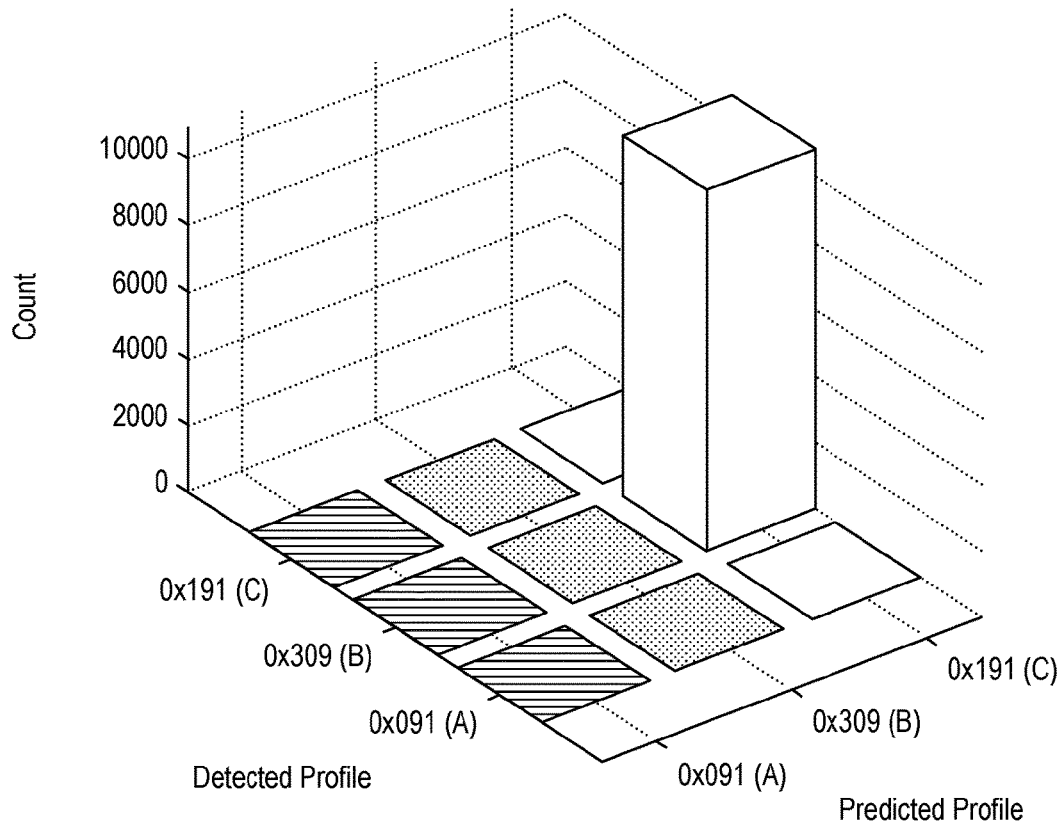

FIG. 18B shows the number of misclassified voltage instances by the constructed Random Forest classifier. It shows that the proposed detection scheme misclassified a large number of 0x309's voltage instances as those of 0x191. In other words, even in the considered ambiguous case, since the constructed classifier observed the measurements in a momentary manner, it was able to determine that message 0x309 was not only injected by B but also by C, i.e., the transmitter of 0x191. This validates that by using voltage instances as inputs for multi-class classification, the proposed detection scheme can correctly verify (possible) false-positive/negative results. One can also look at the considered scenario as a case similar to where two different ECUs have near-equivalent voltage profiles, i.e., a profile collision. Even in such a case, since it was feasible to distinguish them via machine learning, profile collision can be mitigated.

The results obtained from machine learning verification determine the proposed detection scheme's final decision on root-cause analysis and intrusion detection. In other words, the false positive/negative rates of the proposed detection scheme are affected by the performance of the classifier. Therefore, it was also examined how well the voltage instances obtained from the two real vehicles can be correctly classified via Random Forest. Ten-fold cross validation was performed on both datasets with the averages reported across the ten runs. To consider the worst possible case, only 3 base learners were used in the Random Forest classifier.

FIG. 19 (on left) shows the confusion matrix of the Random Forest classifying the Honda Accord's transmitter ECUs via voltage instances. 99.99%, 99.98%, 100%, and 100% of voltage instances output from A, B, C, and D, respectively, were classified as such, while only incurring a total of 0.0041% false decision rate; only 12 out of 292,340 instances were misclassified. When we increased the number of base learns, 100% classification accuracy was achieved. Similarly, FIG. 19 (on right) shows the confusion matrix of the classifier run on the Chevrolet trax's voltage instances. In this case, all voltage instances output from A - D were correctly classified; none of the 234,590 instances were mis-classified.

These results show that momentary voltage instances for different ECUs are discernible enough for the proposed detection scheme's classifier to produce correct results, thus enabling the proposed detection scheme to have significantly low false positive/negative rates with machine learning verification. Especially for root-cause analysis, since the aggregated results of classified voltage instances are used in determining the root-cause (as in FIG. 18b), its false positive/negative rates are much lower than them of the actual classifier.

Since the proposed detection scheme continuously updates the voltage profiles via RLS and exploits them for root-cause analysis, in most cases, the proposed detection scheme can locate the source of the attack. However, its performance may be affected if the voltage profiles have not been updated for a long period of time—most probably when the vehicle has not been turned on for a long time. Since the old voltage profiles may not correctly reflect the current status, the proposed detection scheme may have to reconstruct (instead of update) the voltage profiles. In such a case, adversaries may attempt to bypass The proposed detection scheme by attacking the CAN bus only during the inter-construction period, disrupt the proposed detection scheme, and thus making the proposed detection scheme incapable of handling the attacks. However, even in such a case, as ECUs are powered from the same source and thus all voltage profiles change in the same direction and with the same magnitude, the proposed detection scheme can re-adjust and reuse the old ones as a starting point for voltage profile update rather than reconstruction (when the vehicle is turned on).

One case that might be difficult for the proposed detection scheme to deal with is when more than one ECU are assigned to send messages with the same ID, albeit very unusual. For example, if message ID=0x040 is scheduled to be sent, in turn, by ECUs A-ID, then the proposed detection scheme would be constructing only one (instead of four) voltage profile for 0x040. However, if such scheduling information is known in advance (e.g., every 4n-th message of 0x040 is sent by ID), which is in fact defined by the car makers during the manufacturing phase, then the proposed detection scheme could construct voltage profiles accordingly, thus circumventing the problem.

While state-of-the-art vehicle security solutions are capable of detecting and preventing the attacks, they lack a key feature of identifying the compromised ECU that has attacked the in-vehicle network; an essential need for efficient forensic, isolation, security patch, etc. To meet this need, a novel detection scheme is proposed which fingerprints the transmitter ECU based on voltage measurements. Via the ACK learning phase, the proposed detection scheme obtained correct measurements of voltages output by the message transmitters, and exploited them for constructing and updating their voltage profiles, which were shown to be unique for each ECU. Through the voltage profiles, evaluations on a CAN bus prototype and on two real vehicles that the proposed detection scheme can achieve root-cause analysis as well as intrusion detection with high accuracy are shown. Considering the fact that vehicles are safety-critical and used on a daily basis, the proposed detection scheme is, therefore, an important first step toward not only securing the vehicles but also protecting the safety of drivers and passengers.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for detecting a compromised electronic control unit (ECU) connected to a vehicle bus, comprising:
storing, by a monitor node, a plurality of learned fingerprints in a data store accessible to the monitor node, where each fingerprint in the plurality of learned fingerprints is derived from voltage measurements made during transmission of a message on the vehicle bus and uniquely identifies one of the ECUs connected to the vehicle bus;
measuring, by the monitor node, voltage on the vehicle bus during transmission of a message on the vehicle bus by an ECU, where the voltage on the vehicle bus is measured at less than one million samples per second, wherein measuring voltage further comprises measuring voltage of dominant bits transmitted on the vehicle bus while discarding voltage measurements that correspond to an acknowledgement of the message;
constructing, by the monitor node, an unknown fingerprint from the plurality of voltage measurements made during the transmission of the message, where the unknown fingerprint is indicative of statistical dispersion of the voltage measurements; and comparing, by the monitor node, the unknown fingerprint to the plurality of learned fingerprints and thereby detect a comprised ECU.

2. The method of claim 1 further comprises measuring voltage on two wires forming the vehicle bus.

3. The method of claim 1 wherein discarding voltage measurements further comprises extracting a set of maximum values from voltage measurements made on the vehicle bus during a learning phase;

determining a statistical distribution for the set of maximum values;

identifying a secondary peak in the statistical distribution of the maximum values, where the secondary peak has a peak value less than peak value of a primary peak in the statistical distribution of the maximum values; and setting value of an ACK threshold as a function of the median or mean of values associated with the secondary peak, where the voltage measurements above the ACK threshold are discarded as correspond to an acknowledgement of the message.

4. The method of claim 3 further comprises setting value of the ACK threshold to the median of values associated with the secondary peak minus a multiple of median absolute deviation of the values associated with the secondary peak.

5. The method of claim 3 further comprises setting value of the ACK threshold to the mean of values associated with the secondary peak minus a multiple of median absolute deviation of the values associated with the secondary peak.

6. The method of claim 3 wherein identifying a secondary peak in the statistical distribution of the maximum values further comprises extracting a set of most frequent values from voltage measurements made on the vehicle bus during a learning phase;

determining a statistical distribution for the set of most frequent values;

setting value of a discard threshold in relation to the statistical distribution for the set of most frequency values; and discarding voltage measurements from the plurality of voltage measurements that are below the discard threshold.

7. The method of claim 1 wherein discarding voltage measurements further comprises extracting a set of minimum values from voltage measurements made on the vehicle bus during a learning phase;

determining a statistical distribution for the set of minimum values;

identifying a secondary peak in the statistical distribution of the minimum values, where the secondary peak has a peak value less than peak value of a primary peak in the statistical distribution of the minimum values; and setting value of an ACK threshold as a function of the median or mean of values associated with the secondary peak, where the voltage measurements below the ACK threshold are discarded as correspond to an acknowledgement of the message.

8. The method of claim 1 wherein constructing an unknown fingerprint further comprises grouping the plurality of voltage measurements into groups of voltage measurements, where each group include two or more voltage measurements;

for each group of voltage measurements, computing a median of the voltage measurements in the group of voltage measurements and computing one more percentiles for the voltage measurements in the group of voltage measurements;

for each group of voltage measurements, determining a cumulative deviation of the median of the voltage measurements in the group of voltage measurements from an expected mean value;

for each group of voltage measurements, determining a cumulative deviation of the one or more percentiles of the voltage measurements in the group voltage measurements from an expected percentile value; and for each group of voltage measurements, forming a voltage profile by summing the cumulative deviation of the median of the voltage measurements the cumulative deviation of the one or more percentiles of the voltage measurements.

9. The method of claim 8 further comprises accumulating values of the voltage profile across groups of voltage measurements and defining the unknown fingerprint as slope of the accumulated values.

10. A method for detecting a compromised electronic control unit (ECU) connected to a vehicle bus formed by two wires, comprising:

storing, by a monitor node, a plurality of learned fingerprints in a data store accessible to the monitor node, where each fingerprint in the plurality of learned fingerprints is derived from voltage measurements made during transmission of a message on the vehicle bus by an ECU and uniquely identifies one of the ECUs connected to the vehicle bus;

measuring, by the monitor node, voltage on the vehicle bus during transmission of a message on the vehicle bus, thereby yielding a plurality of voltage measurements;

discarding a subset of the plurality of voltage measurements, where the voltage measurements in the subset correspond to an acknowledgement of the message;

constructing, by the monitor node, an unknown fingerprint from remaining voltage measurements in the plurality of voltage measurements, where the unknown fingerprint is indicative of statistical dispersion of the voltage measurements; and comparing, by the monitor node, the unknown fingerprint to the plurality of learned fingerprints and thereby detecting a comprised ECU.

11. The method of claim 10 further comprises measuring voltage on both of two wires forming the vehicle bus.

12. The method of claim 10 further comprises extracting a set of maximum values from voltage measurements made on the vehicle bus during a learning phase;

determining a statistical distribution for the set of maximum values;

identifying a secondary peak in the statistical distribution of the maximum values, where the secondary peak has a peak value less than peak value of a primary peak in the statistical distribution of the maximum values; and setting value of an ACK threshold as a function of the median or mean of values associated with the secondary peak, where the voltage measurements above the ACK threshold are discarded as correspond to an acknowledgement of the message.

13. The method of claim 12 further comprises setting value of the ACK threshold to the median of values associated with the secondary peak minus a multiple of median absolute deviation of the values associated with the secondary peak.

14. The method of claim 12 further comprises setting value of the ACK threshold to the mean of values associated with the secondary peak minus a multiple of median absolute deviation of the values associated with the secondary peak.

15. The method of claim 12 wherein identifying a secondary peak in the statistical distribution of the maximum values further comprises
   extracting a set of most frequent values from voltage measurements made on the vehicle bus during a learning phase;
   determining a statistical distribution for the set of most frequent values;
   setting value of a discard threshold in relation to the statistical distribution for the set of most frequency values; and
   discarding voltage measurements below the discard threshold.

16. The method of claim 10 further comprises
   extracting a set of minimum values from voltage measurements made on the vehicle bus during a learning phase;
   determining a statistical distribution for the set of minimum values;
   identifying a secondary peak in the statistical distribution of the minimum values, where the secondary peak has a peak value less than peak value of a primary peak in the statistical distribution of the minimum values; and
   setting value of an ACK threshold as a function of the median or mean of values associated with the secondary peak, where the voltage measurements below the ACK threshold are discarded as correspond to an acknowledgement of the message.

17. The method of claim 10 wherein constructing an unknown fingerprint further comprises
   measuring voltage on a first wire of the two wires forming the vehicle bus;
   grouping the voltage measurements from the first wire into groups of first voltage measurements, where each group include two or more voltage measurements;
   for each group of first voltage measurements, computing a median of the voltage measurements in the group of voltage measurements and computing one or more percentiles for the voltage measurements in the group of voltage measurements;
   for each group of first voltage measurements, determining a cumulative deviation of the median of the voltage measurements in the group of voltage measurements from an expected median value;
   measuring voltage on a second wire of the two wires forming the vehicle bus;
   grouping the voltage measurements from the second wire into groups of second voltage measurements, where each group include two or more voltage measurements;
   for each group of second voltage measurements, computing a median of the voltage measurements in the group of voltage measurements and computing one or more percentiles for the voltage measurements in the group of voltage measurements;
   for each group of second voltage measurements, determining a cumulative deviation of the median of the voltage measurements in the group of second voltage measurements from an expected median value;
   for each group of second voltage measurements, determining a cumulative deviation of the one or more percentiles of the voltage measurements in the group of second voltage measurements from an expected percentile value; and
   forming a voltage profile by summing the cumulative deviation of the median of the voltage measurements in the group of first voltage measurements with the cumulative deviation of the median of the voltage measurements in the group of second voltage measurements and with the cumulative deviation of the one or more percentiles of the voltage measurements in the group of first voltage measurements and with the cumulative deviation of the one or more percentiles of the voltage measurements in the group of second voltage measurements.

18. The method of claim 17 further comprises accumulating values of the voltage profile across groups of voltage measurements and defining the unknown fingerprint as slope of the accumulated values.

* * * * *